(12) United States Patent
Matthews et al.

(10) Patent No.: US 7,673,307 B2
(45) Date of Patent: Mar. 2, 2010

(54) MANAGING TRANSACTIONS IN A MESSAGING SYSTEM

(75) Inventors: Daniel James Matthews, Southampton (GB); David Pitcher, Winchester (GB); Stephen James Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1848 days.

(21) Appl. No.: 10/666,793

(22) Filed: Sep. 18, 2003

(65) Prior Publication Data

US 2004/0240444 A1 Dec. 2, 2004

Related U.S. Application Data

(63) Continuation-in-part of application No. 10/448,269, filed on May 29, 2003, now abandoned.

(51) Int. Cl.
*G06F 3/00* (2006.01)
*G06F 9/44* (2006.01)
*G06F 9/46* (2006.01)
*G06F 13/00* (2006.01)

(52) U.S. Cl. ...................... 719/314; 719/313
(58) Field of Classification Search ............ 719/313, 719/314
See application file for complete search history.

(56) References Cited

U.S. PATENT DOCUMENTS

| 5,778,179 | A  * | 7/1998  | Kanai et al. ............. 709/203 |
| 5,916,307 | A  * | 6/1999  | Piskiel et al. ............ 719/314 |
| 6,209,038 | B1 * | 3/2001  | Bowen et al. ............ 709/238 |
| 6,275,843 | B1 * | 8/2001  | Chorn .................... 718/101 |
| 6,324,589 | B1 * | 11/2001 | Chessell ................. 719/316 |
| 6,425,017 | B1 * | 7/2002  | Dievendorff et al. ...... 719/315 |
| 6,442,533 | B1 * | 8/2002  | Hinkle ................... 705/36 R |
| 6,446,206 | B1 * | 9/2002  | Feldbaum ................ 713/175 |
| 6,529,932 | B1 * | 3/2003  | Dadiomov et al. ........ 718/101 |
| 6,535,904 | B2 * | 3/2003  | Klein et al. ............. 718/101 |
| 6,721,288 | B1 * | 4/2004  | King et al. .............. 370/310 |
| 6,817,018 | B1 * | 11/2004 | Clarke et al. ............ 719/313 |
| 6,868,441 | B2 * | 3/2005  | Greene et al. ........... 709/220 |
| 7,222,148 | B2 * | 5/2007  | Potter et al. ............ 709/201 |
| 2002/0095656 | A1 * | 7/2002 | Clark et al. ............. 717/107 |
| 2003/0050972 | A1 * | 3/2003 | Felt et al. .............. 709/203 |

OTHER PUBLICATIONS

Bernstein, P. A., Hsu, M., and Mann, B., "Implementing recoverable requests using queues", 1990, ACM Press, Proceedings of the 1990 ACM SIGMOD international Conference on Management of Data, SIGMOD '90, pp. 112-122.*

(Continued)

*Primary Examiner*—Hyung S Sough
*Assistant Examiner*—KimbleAnn Verdi
(74) *Attorney, Agent, or Firm*—DeLizio Gilliam, PLLC

(57) ABSTRACT

A messaging system and method are provided to enable transactional work, done as a result of a recipient processing an asynchronous message, to be involved in the transaction under which message was sent. Involvement may be directly in the senders transaction or indirectly through a separate transaction which can be a subordinate to, a child of, or merged with the transaction under which message was sent. The message is delivered by calling an operation, a definition of which has been registered for the queue. If the message is added to a queue for subsequent delivery to a recipient, details of the transaction under which message was sent are added to the message. As a result the recipient can take appropriate action to ensure that any transactional work, it causes to happen, will be done directly or indirectly under the scope of the transactions under which message was sent.

36 Claims, 16 Drawing Sheets

OTHER PUBLICATIONS

Tai, S. and Rouvellou, I., "Strategies for integrating messaging and distributed object transactions",2000, Springer-Verlag, IFIP/ACM international Conference on Distributed Systems Platforms, pp. 308-330.*

Tai, Stefan "Strategies for Integrating Messaging and Distributed Object Transactions", *IFIP/ACM International Conference on Distributed systems platforms*, (Apr. 3, 2007),308-330.

"U.S. Appl. No. 10/448,269 Non-Final Office Action", Mar. 6, 2009.

* cited by examiner

MANAGING TRANSACTIONS IN A MESSAGING SYSTEM

CROSS REFERENCE TO RELATED APPLICATIONS

This application is a continuation-in-part of the following copending and commonly assigned application entitled "A SYSTEM AND METHOD FOR MANAGING TRANSACTIONS IN A MESSAGING SYSTEM", U.S. application Ser. No. 10/448,269, filed on May 29, 2003.

FIELD OF THE INVENTION

The present invention relates, in general, to messaging systems and more particularly to involving work done, as a result of the delivery of a message, in a transaction.

BACKGROUND TO THE INVENTION

Asynchronous transfer of requests or messages between application programs running on different data processing systems within a network is well known in the art and is implemented, for example, by a number of commercially available messaging systems. These systems include IBM Corporation's MQSeries® family of messaging products, which use asynchronous messaging via queues. A sender application program issues a PutMessage command to send (put) a message to a target queue, and MQSeries queue manager programs handle the complexities of transferring the message under transactional control from the sender application to the target queue, which may be remotely located across a heterogeneous computer network. The target queue is a local input queue for another application program, which retrieves (gets) the message from this input queue by issuing a GetMessage command asynchronously from the send operation. The receiver application program then performs its processing on the message, and may generate further messages. MQSeries and IBM are trademarks of International Business Machines Corporation.

Transference of messages carried out under transaction control gives assured once and once-only message delivery of messages even in the event of system or communications failures. A feature of such transactional control is that a message that is put to a target queue does not become available on the target queue until the transaction, under which it is put to the queue, is committed. Once the transaction is committed the message is delivered to the target queue and the receiver application can get and use the message as a trigger to carry out a unit of work, which may be done under the scope of a second transaction. This delay of sending the message is considered necessary because the result of rolling back a transaction under which a message is sent must be the same as if the message was not sent.

However this behaviour has two drawbacks. One is that a transaction can succeed whilst the work done on its behalf as a result of sending a message can fail. The second is that two transactions are involved in processing the sending of the message and the work done as a result of the message, when performance might be better served by completing the work under a single transaction as this can require less logging.

SUMMARY OF THE INVENTION

Accordingly, according to a first aspect the present invention provides a data processing method for a data processing system comprising a messaging service and a transaction service, the method comprising the steps of: receiving a request, from a sender, to send an asynchronous message, comprising message data, to a queue, wherein the request is received under the scope of a transaction; registering a definition for the queue, the definition providing details of an operation provided by the recipient; processing the request to send a message by delivering the message, prior to completion of the transaction, to a recipient which is registered with the messaging service to process messages from the queue wherein the message is delivered to the recipient by calling the operation and including details of the message; receiving one or more requests to register involvement of one or more participants in the transaction, wherein each participant represents transactional work done as a result of the recipient processing the message; and completing the transaction wherein the completing step comprises instructing each of the one or more participants to complete; whereby transactional work done, as a result of the recipient processing the message, is involved in the transaction under the scope of which the message was sent.

According to a second aspect the present invention provides A data processing system comprising a messaging service and a transaction service, the system comprising: means for the messaging service to receive a request, from a sender, to send an asynchronous message comprising message data to a queue, wherein the request is received under the scope of a transaction; means for registering a definition for the queue, the definition providing details of an operation provided by the recipient; means for the messaging service to process the request to send an asynchronous message by delivering the message, prior to completion of the transaction, to a recipient which is registered with the messaging service to process messages from the queue wherein the message is delivered to the recipient by calling the operation and including details of the message; means for the transaction service to receive a request to register involvement of a participant in the transaction, wherein the participant represents transactional work done as a result of the recipient processing the message; and means for the transaction service to complete the transaction comprising instructing each participant in the transaction to complete; whereby transactional work done, as a result of the recipient processing the message, is involved in the transaction under the scope of which the message was sent.

According to a third aspect the present invention provides a computer program product comprising instructions which, when executed on a data processing host, cause the host to carry out the first aspect.

Thus an asynchronous message may be sent, and work done as a result of the message, both under the scope of a single transaction. As a result it is possible to fail the transaction under which the message is sent if processing of the message fails. Further in some scenarios the sending of the message and processing of the message requires only a single transaction. The message is provided to the recipient whilst the sender's transaction (the transaction under the scope of which the sender made the request to send the message) is still active. Further any transactional work done as a result of the message is completed as part of completion of the sender's transaction. If the transaction is committed, the transactional work is committed and, if the transaction is rolled back, the transactional work is rolled back, much the same as if the message was never sent. The transactional work is registered with the transaction through one or more participants. A participant, for example, could directly represent transactional work involved in the senders transaction, or could represent a second transaction, which defers to the sender's transaction, and which indirectly represent transactional work registered with it. Note the definition of the queue registered with the messaging system specifies an operation for processing an incoming message. As a result the message is delivered to the recipient by passing it directly to the operation specified for the queue to which the message is sent and as a result the message is not added to the queue. A queue can be defined in this way for both a queue which is local to the sender and a queue which is remote to the sender.

If the message is added to a local queue or is sent to a remote queue details of the sender's transaction are added to the message so that the recipient of the message can become aware of the transaction of the sender. It may then process the message as part of the transaction under which the message was sent, or as part of a second transaction which is under the scope of the transaction under which the message was sent.

There are several methods of ensuring work done as a result of the processing of the message by the recipient is involved in the sender's transaction. Preferably the recipient is registered as a participant in the transaction so that it can take part in transaction completion. This enables the recipient to processes the message on a different thread in the same process as the sender, or in a different process to the sender. If the recipient executes under the scope of a second transaction, the recipient can act as a representative of that transaction or alternatively the second transaction can be registered as a participant in the sender's transaction.

If the recipient is registered as a participant in the transaction there are several methods of achieving this. Preferably registration of the recipient is done before the message is delivered and during registration the transaction is informed of the message queue to which the message is being sent. In this case the recipient is instructed to complete by sending one or more messages to that effect to the queue. Alternatively the registration request can specify a different queue to which completion messages should be sent. In this case the different queue might be a queue created for this purpose by the recipient. Alternatively the recipient could register directly with the senders transaction, for example, using a remote procedure call.

When a message is delivered to a recipient on a different thread to that of the sender it is possible that the recipient is waiting on behalf of a second recipient, such as a Message Driven Bean, and is already executing under the scope of a different transaction (recipient's transaction) to the sender. In this case the recipient's transaction is informed of the sender's transaction so that it is aware that it is running under the scope of the senders transaction, and as a result will only commit when directed to do so by the sender's transaction. The message is then given to the second recipient to process under the scope of the second transaction. As a result any participants that register as a result of the processing of the message by the second recipient, register with the recipient's transaction. Alternatively the recipient may be waiting outside the scope of a transaction in which case it can start the recipient's transaction prior to informing it of the sender's transaction.

If the recipient runs under the scope of a recipient's transaction preferably it registers as a temporary participant in the recipient's transaction prior to passing the message to the second recipient for processing it and then unregisters on return from the second recipient. This informs the recipient transaction that it cannot complete whilst the second recipient is still processing. This is useful if the recipient's transaction can receive a completion request from the sender's transaction on a different thread to that on which the second recipient is processing.

Preferably, if the unregistering step is employed it is used to pass a vote as to whether the recipients transaction should commit or rollback. This vote can be based on a return code from the second recipient which indicates whether or not the message was successfully processed. Optionally if such a vote is included, the recipient's transaction can be marked for rollback only if the vote indicates rollback.

Optionally the recipient's transaction can act as a subordinate transaction to the sender's transaction. As a result it will only complete when instructed to do so by the sender's transaction and any failure in the recipient's transaction will result in failure of the sender's transaction.

Alternatively the recipient's transaction can act as a nested transaction with the sender's transaction as its parent. As a result it can rollback in advance of the sender's transaction and its failure need not cause failure in the sender's transaction. In this case preferably, if the unregister request includes a vote and the vote indicates rollback, the action of the nested transaction will be to rollback itself and restore the message to the message queue, giving the appearance that the message has not yet been processed.

BRIEF DESCRIPTION OF THE DRAWINGS

The invention will now be described, by way of example only, with reference to a preferred embodiment thereof, as illustrated in the accompanying drawings, in which.

DETAILED DESCRIPTION OF THE PREFERRED EMBODIMENT

Figure 1:
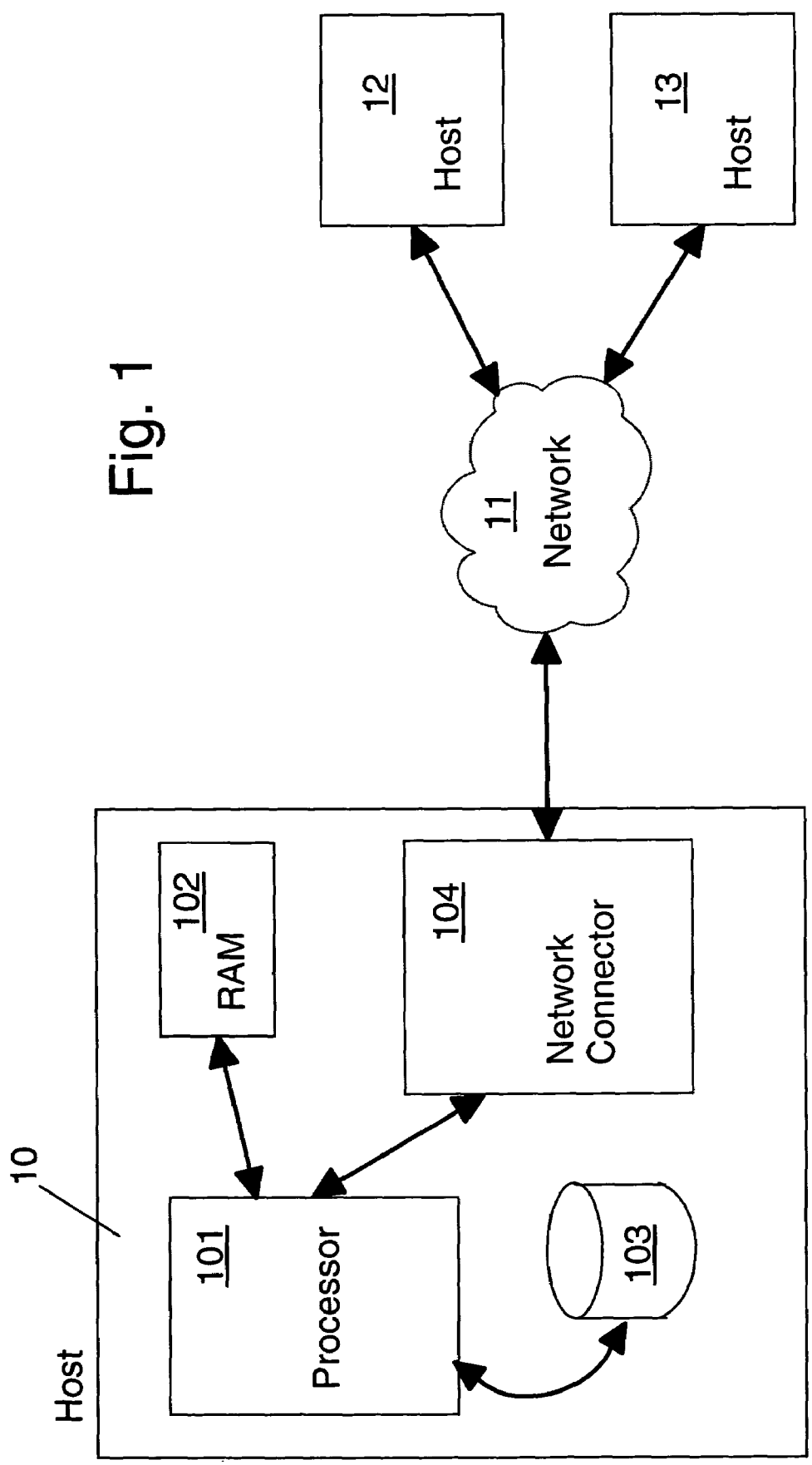
FIG. 1 is a block diagram of data processing environment in which the preferred embodiment of the present invention is advantageously applied.

In FIG. 1, a data processing host apparatus 10 is connected to other data processing host apparatuses 12 and 13 via a network 11, which could be, for example, the Internet. The hosts 10, 12 and 13, in the preferred embodiment, comprise a J2EE® (Java 2 Enterprise Edition) product. The J2EE product is running in one or more processes on each host, and is used for the transfer of messages, on channels, between message queues, defined in the same or a different process. The channels may be standard channels or fast channels. A standard channel provides assured once and once only delivery of messages. A fast channel does not provide such a delivery guarantee and as a result can provide faster transmission of messages. Host 10 has a processor 101 for controlling the operation of the host 10, a RAM volatile memory element 102, a non-volatile memory element 103 on which a log of message activity is stored, and a network connector 104 for use in interfacing the host 10 with the network 11 to enable the hosts to communicate.

Figure 2:
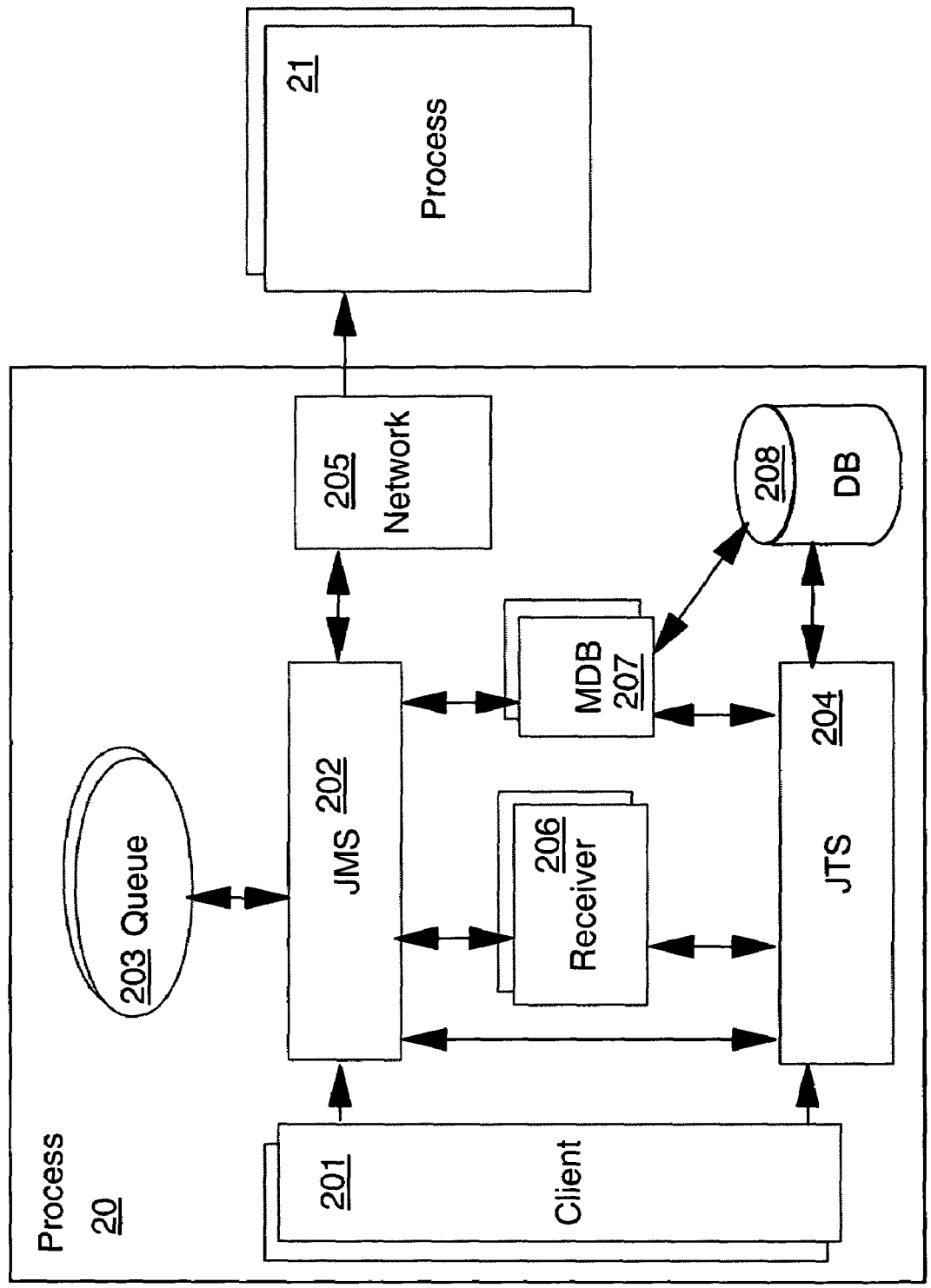
FIG. 2 is a schematic diagram of the various components of a process, and their interactions, which comprise the preferred embodiment of the present invention.

FIG. 2 is a schematic diagram of a process (20) which can send and receive a message within the process (20), send a message to another process (21) and receive a message from another process (21), according to the preferred embodiment of the present invention. The process (20) comprises implementations of a J2EE product, one or more client applications (201), one or more MDBs (Message Driven Beans) (207), a Network component (205), and a database (208). The J2EE product comprises implementations of a JMS (Java Message Service) (202) and a JTS (Java Transaction Service) (204), and provides support for creation and use of one or more message queues (203) and one or more message receivers (206).

A client application (201) requests the JTS (204) to start and complete a transaction and requests the JMS (202) to send one or more messages within the scope of a transaction to a target queue. The target queue may be a local queue (203) or a remote queue in another process (21) and there may be a receiver (206) or an MDB (207) registered to receive messages from a local queue (203). For sending a message from the client application (201) to a local queue the JMS (202) receives the message and either passes it directly to a registered receiver (206) or MDB (207), or adds it to the targeted queue (203) for later retrieval by a receiver (206) or MDB (207). When adding a message to a local queue or sending a message to remote queue the JMS (202) obtains details of the active transaction from the JTS (204), adds the details to the message and registers as a participant in that transaction, prior to adding the message to the queue. For a remote queue adding the message to the queue involves transmitting the message to the target queue via the network component (205).

When receiving a remote message which includes details of a transaction under which the message was sent, the JMS (202) either adds the message to the targeted queue for later retrieval by a receiver (206), or passes it directly to a receiver (206). When a receiver (206) is given a message (directly or indirectly via a queue) which contains details of the sender's transaction, it ensures that it is running within the scope of a local transaction, starting a local transaction if necessary, and then informs it of the sender's transaction. The local transaction then acts as a subordinate or nested transaction to the sender's transaction. The receiver (206) then passes the message for processing to an MDB (207).

An MDB (207), when processing a message (which was sent locally or remotely) may register, with the JTS (204), participants in the transaction under the scope of which it is running. Further the MDB (207) may access a database (208), such as DB2, which may also register participants in the transaction under the scope of which it is accessed.

The JTS (204), is used by the client (201) to complete a transaction it started and under which messages were sent. The JTS (204) may also receive completion requests, via messages from another transaction, for a transaction which it was requested to start. This may happen if the transaction was started by a receiver (206) as a result of receiving a message which included details of the sender's transaction. For local messages processed directly by an MDB, participants in the transaction will be directly registered with the transaction service. For messages processed by a receiver, participants may be registered via a queue which may be local or remote, and may be under the scope of a subordinate or nested transaction. The JTS (204) completes directly registered participants by calling them directly and queue registered participants by using messages. If in completing a transaction the JTS (204) sends transaction completion messages to which responses are required, it creates a local queue (203) and receiver (206) which is registered with the JMS (202). During the transaction completion the JTS (204) may request registered participants to, for example, prepare, commit_one_phase, commit or rollback. Further the JTS (204) may respond to transaction completion requests, for example, it may respond to prepare with a vote and to commit with an outcome.

Note that in another embodiment a process may only be able to process either the sending of message to a remote queue, or receipt of messages from a remote sender. Further a process may only be able to process messages which are sent and received locally.

FIG. 3 to 7 are sequence diagrams of flows between the components of FIG. 2. The flows show the processing of a message which is sent and received locally and the processing of a message sent between two processes. As a result, in FIGS. 3 to 7, the names used for the components shown in FIG. 2 are post fixed with "_C" for the process which contains the client application (e.g.: JTS_C) and "_S" for components in the process which only receives a remote message. Note that in the flows in the figures are simplified as only the flows required to illustrate the preferred embodiment of the present invention are shown. However, any flows that are not shown would be obvious to a person skilled in the art. For example, the transmission of messages from one process to another involves a plurality of flows between message services, particularly with assured once and once only delivery. However, the flows required to obtain this behavior is well known to those in the art and so in the figures the transmission of a message is shown as a single flow.

Further note that return flows are not shown for calls where the return flow would immediately follow the call as illustrated in the figures.

Figure 3:
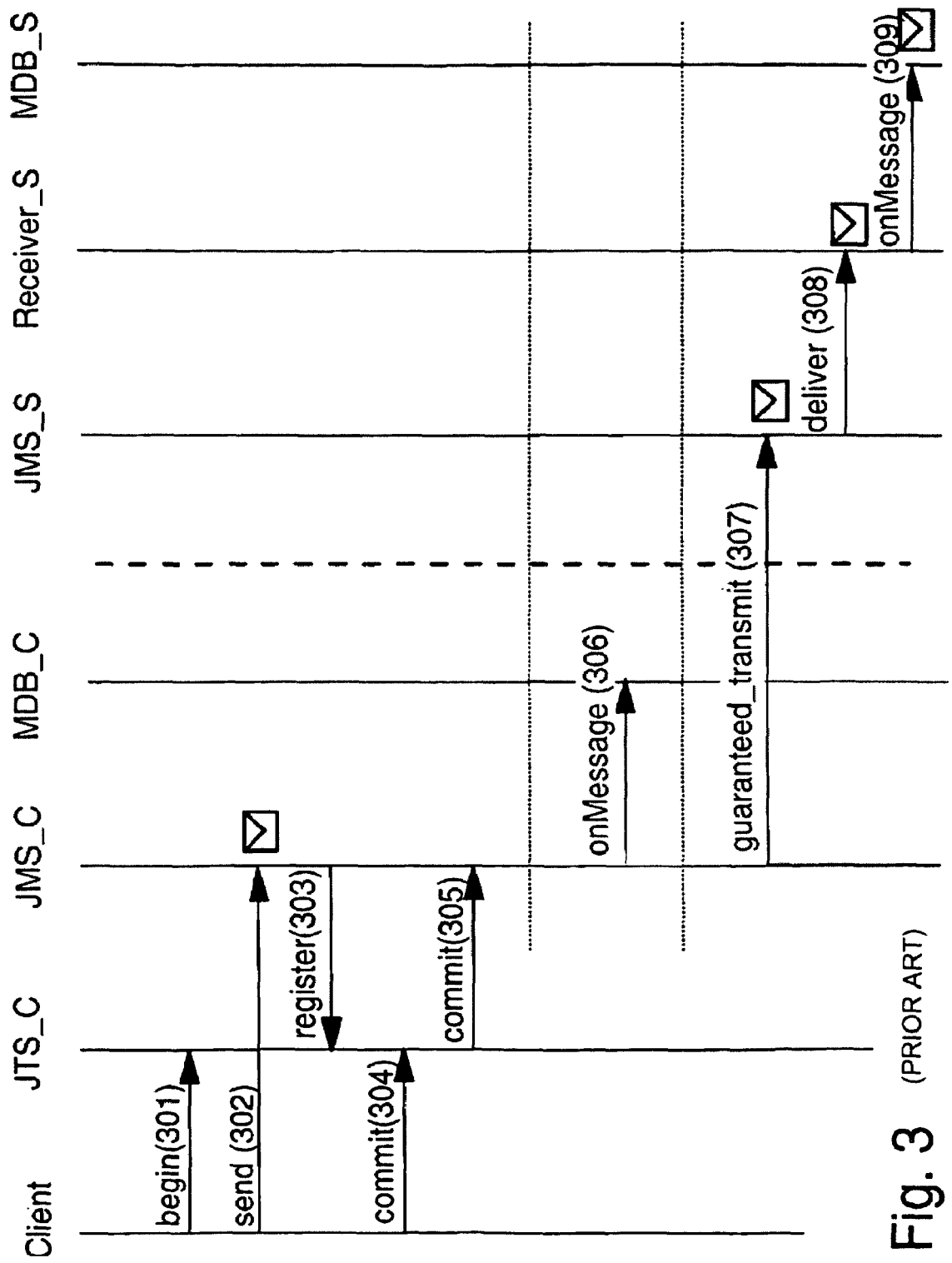
FIG. 3 is a sequence diagram of sending an asynchronous message in a transaction according to the prior art.

FIG. 3 shows the sending of an asynchronous message under the scope of a transaction and completion of that transaction for a message processed locally and a message processed remotely, according to the prior art. The client application begins a transaction (301) with the local JTS, JTS-C and then requests the JMS, JMS_C, to send a message (302) to a queue for ultimate delivery to a message driven bean. The send request is processed by the local JMS, JMS_C, which, being aware of the transaction, registers as a participant in the transaction (303) and retains the message for later delivery. When the client completes all other work (if any) involved in the transaction it asks the local JTS, JTS_C, to commit the transaction (304) which causes JMS_C to make the message available for processing. The transaction is then complete. How the message is made available by the JMS depends on whether the target queue is local or remote. The figure now shows an example flow for a local queue as flow 306, and an example flow for a remote target queue as flows 307, 308, and 309. If the target queue is local the JMS makes the message available either by putting the message on the target queue for subsequent retrieval by a receiver or MDB (not shown), or passing the message directly to either a registered MDB (306) or a registered receiver for ultimate delivery to an MDB (not shown). However, if the target queue is remote the message is transmitted (307), with assured once and once only delivery, to JMS_S, the JMS of the remote system for addition to the target queue. When JMS_S receives the message it either adds it to the queue for subsequent receipt by a receiver (not shown) or delivers it (308) directly to a receiver registered to receive messages from the queue. The receiver then passes the message (309) to the MDB for processing. Note that the message is transmitted to the remote system with assured once and once only delivery because commit of the transaction must guarantee delivery of the message. Note that, in either the local or remote case, any work done by the MDB which processes the message cannot be part of the transaction under which the message was sent because that transaction completed when the message was made available. As a result the MDB processes the message under the scope of a different transaction to that under which the message was sent. Further note that if the transaction had been rolled back the message would simply have been deleted at step 305.

According to the preferred embodiment of the present invention the JTS and JMS are modified to enable a unit of work, carried out as a result of processing a message which was sent, to be included in the transaction under the scope of which the message was sent. The message may be sent and received locally, or sent and received remotely. A method in which this can be achieved will now be described with reference to FIGS. 4, 5, 6 and 7. Further note that a goal in the preferred embodiment is to make the invention transparent to the sender and the receiver of the message.

Figure 4:
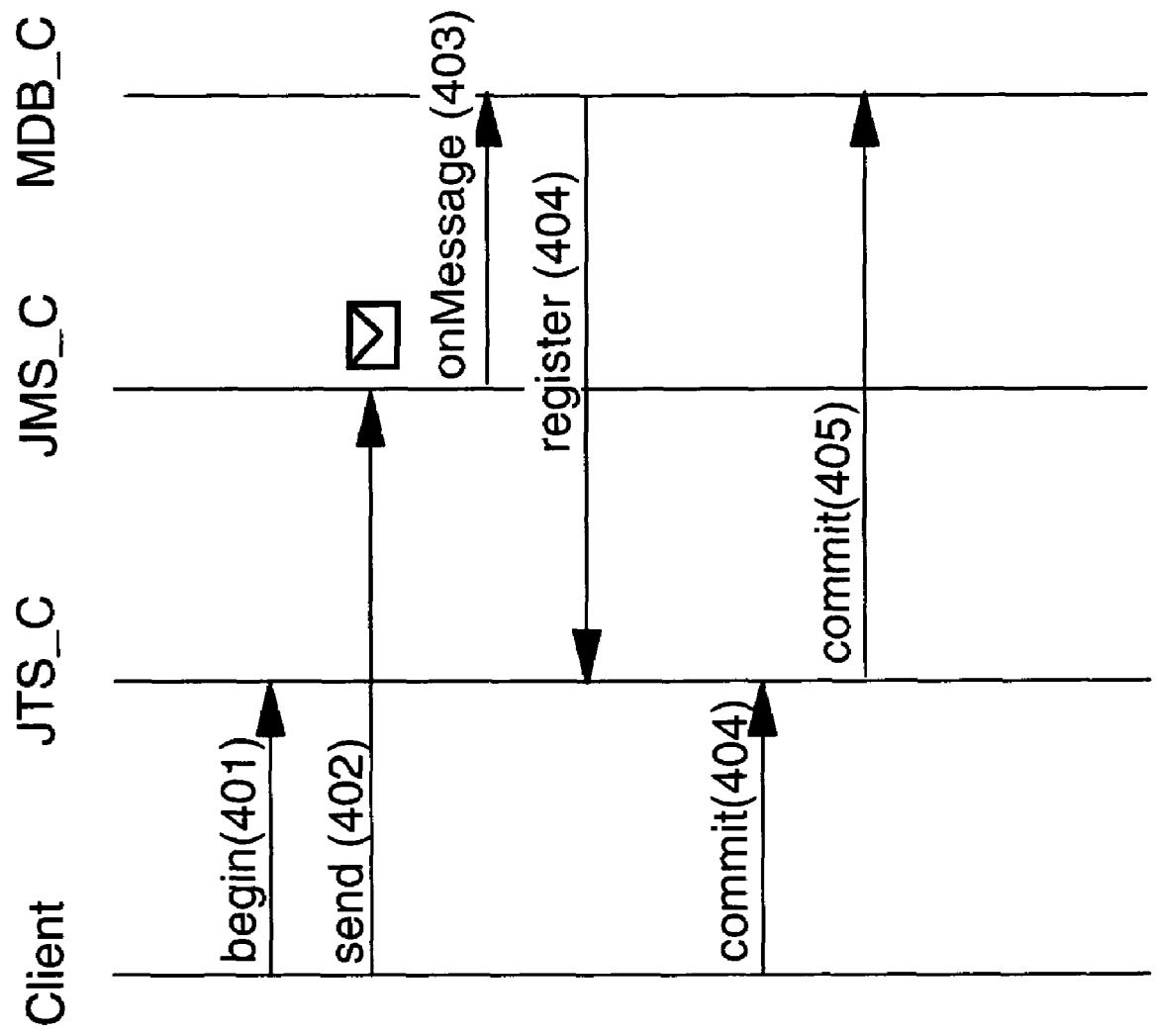
FIG. 4 is a sequence diagram of sending an asynchronous message, within a process, under the scope of a transaction according to the preferred embodiment of the present invention.

FIG. 4 shows an example of sending and receiving of a message locally, by a registered MDB, according to the preferred embodiment of the present invention. The client application begins a transaction (401) and requests the JMS to send a message (402) to a target queue as in the prior art (step 301 and 302 of FIG. 3). However JMS_C now delivers the message (403) directly to MDB_C without waiting for the transaction to commit. The MDB then does work under the scope of the client started transaction and as a result participants in the transaction are registered, for example, by the MDB (404) and/or databases that it calls (not shown), directly with the client started transaction. Once the MDB has finished processing the client regains control and subsequently commits the transaction (405). This causes the JTS to commit the participant (406) that registered with it. Note that if the client had requested JTS_C to rollback the transaction to rollback at step 404, the JTS would have informed the participant to rollback at step 405. Further note that if more than one participant had registered involvement in the transaction, transaction commit would also involve requesting each participant in the transaction to prepare before asking it to commit.

Figure 5:
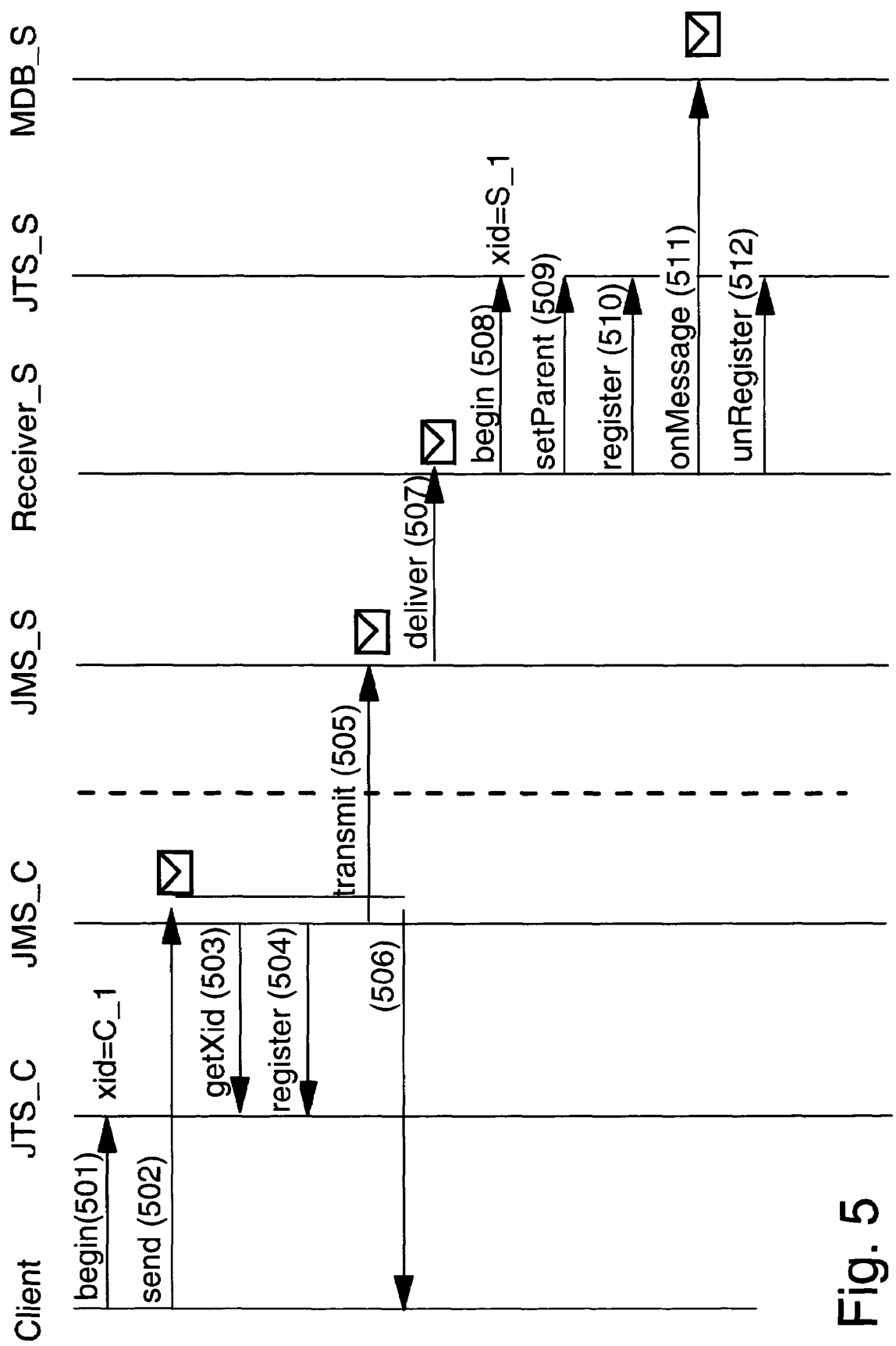
FIG. 5 is a sequence diagram of sending a message, to a remote queue, under the scope of a transaction according to the preferred embodiment of the present invention.
Figure 6:
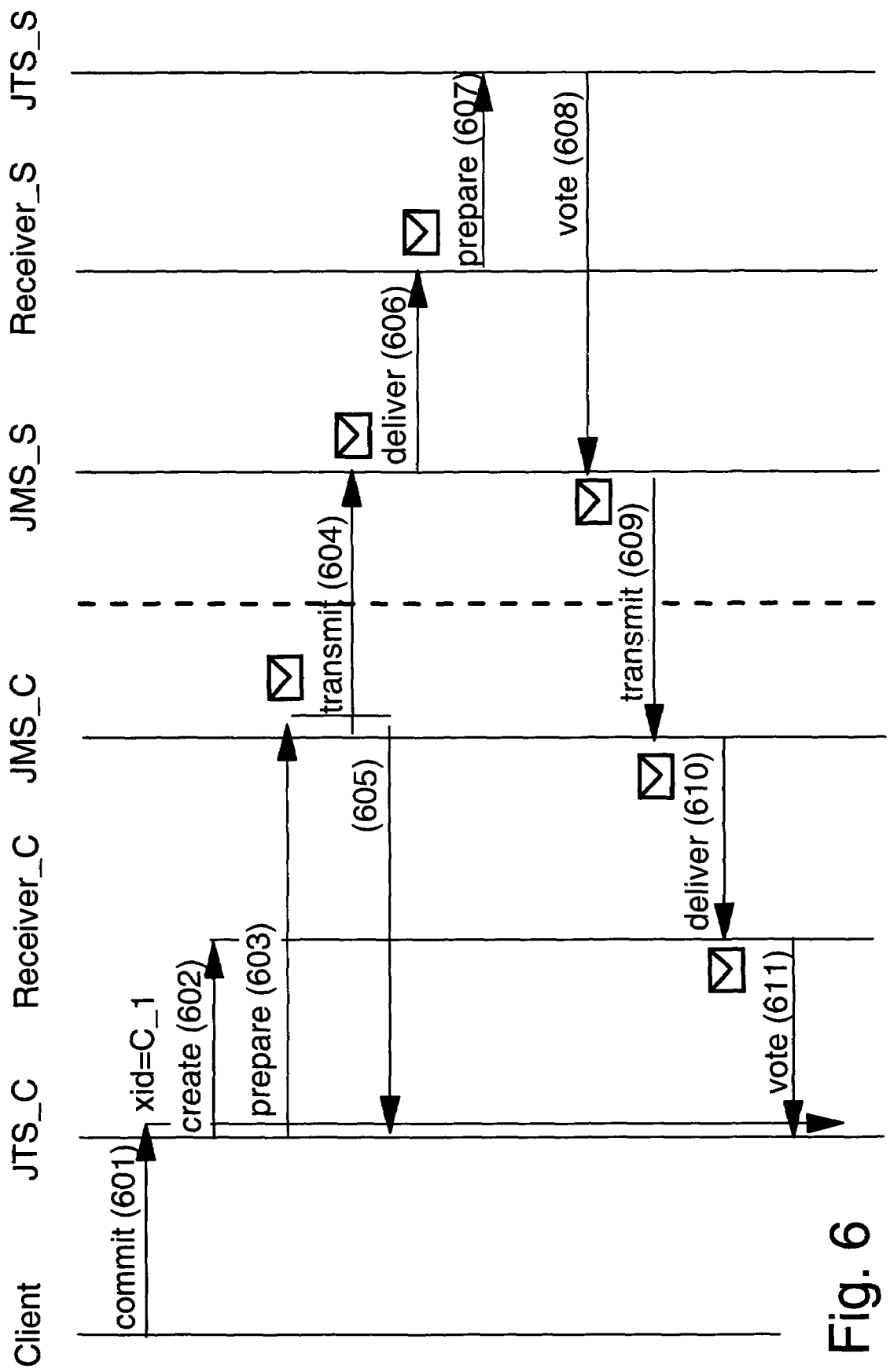
FIG. 6 is a sequence diagram of prepare processing for the transaction of FIG. 5.
Figure 7:
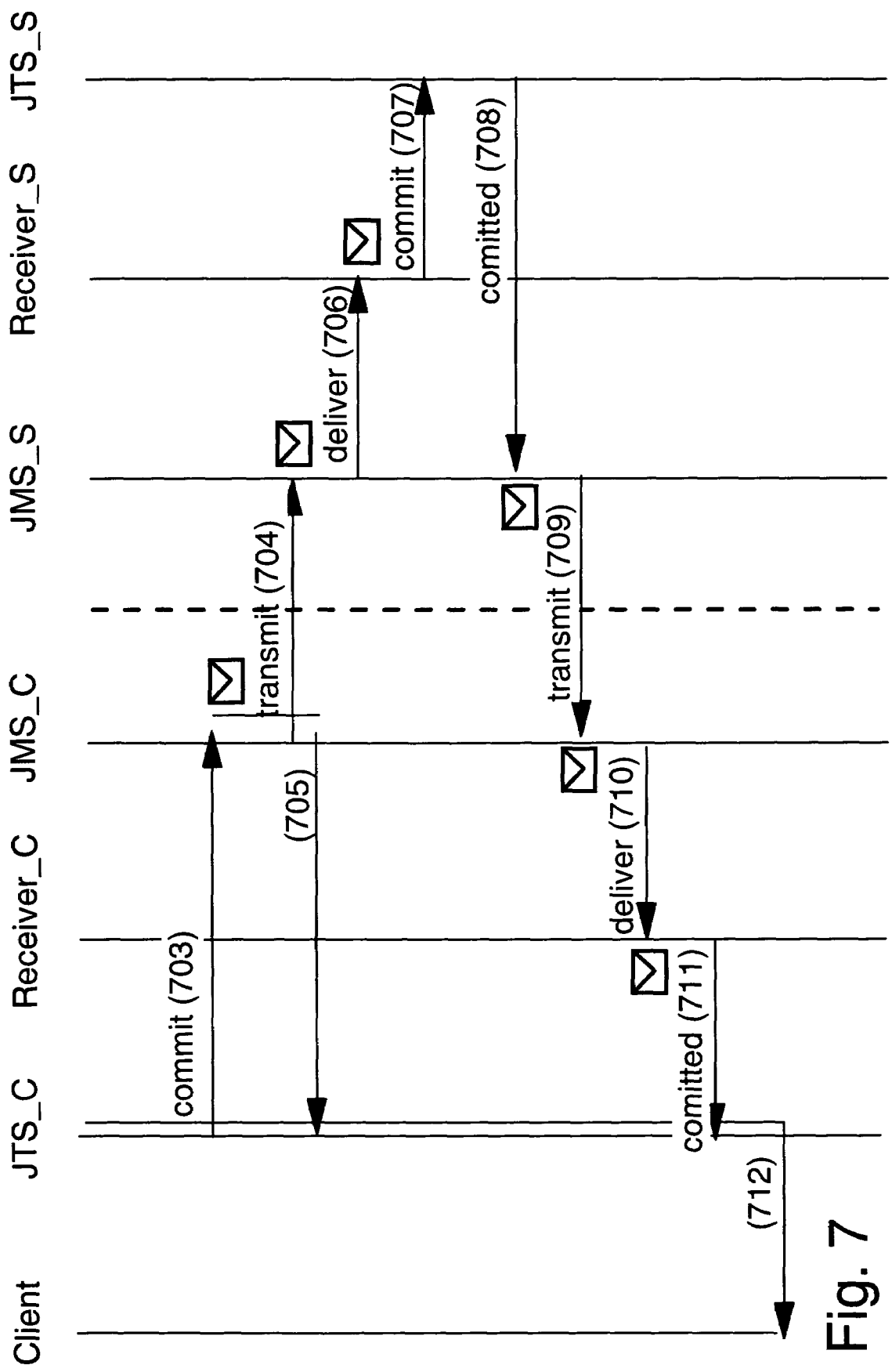
FIG. 7 is a sequence diagram commit processing for the transaction of FIG. 5.

FIGS. 5, 6 and 7 show an example of the processing of a message sent to a remote queue, according to the preferred embodiment of the present invention. Further these figures illustrate the flow for two phase commit as opposed to FIG. 4 which showed one phase commit, however note that although a two phase transaction would involve at least two participants in the client process, only the flows required to involve one asynchronous participant in the transaction are shown.

In FIG. 5 the client application (sender) begins (501) a transaction by calling its local JTS, JTS_C. The transaction, in this example, is given an xid (transaction id) of C_1. The client then sends (502) a message for delivery to a remote queue, Q_S (not shown in the figures) and ultimate delivery to MDB_S, via the local JMS, JMS_C. Preferably the message is non-persistent and ultimately transmitted on a fast channel which means it will not have once and once only delivery guarantee. On receipt of the client request to send a message, JMS_C obtains the xid (503) of the current transaction (C_1, the transaction under which the message was sent) from JTS_C and adds details of it to the message. For example, these details, which comprise the xid, could be added as an extension to the message header, or as a message property, of the message being sent. JMS_C then registers (504) involvement of Q_S in transaction C_1, by calling JTS_C passing sufficient information, such as the name of the queue and the process in which it exists, for JTS_C to send a message to Q_S during transaction completion processing. The message is then transmitted (505) to Q_S, preferably as a non-persistent message on a fast channel, before control returns (506) to the client. At this point the client may continue processing under the scope of the transaction. This may include involving other participants in the transaction according to the prior art or according to the preferred embodiment of the present invention.

Meanwhile, in the system in which the remote queue (Q_S) resides, Receiver_S has been created to receive messages from Q_S and is waiting to obtain the first message (steps not shown). This will have been completed at some earlier point by the container of the Message Driven Bean, MDB_S, which has been defined to handle messages sent to Q_S. As a result when the message arrives it is delivered directly (507) by the local JMS, JMS_S, to Receiver_S (it does not need to be placed on the targeted queue). On receipt of this message Receiver_S begins (508) a new transaction with the local JTS, JTS_S, which is given an xid of S_1. It then passes (509) to transaction S_1 details of transaction C_1 which were received with the message. This informs the new transaction that it is a subordinate transaction to C_1, its superior transaction, and as a result it will wait to complete until it is instructed to do so by transaction C_1 (a superior transaction controls its own outcome and the outcome of the subordinate). Note that in a working system transaction ids need to be unique across communicating processes and as a result would normally comprise a time stamp, a process id, and host name.

Next the Receiver_S calls (510) JTS_S to register, with transactions S_1, the fact that it is about to pass the message, for processing, to MDB_S which was set up to handle messages sent to the Q_S. This informs JTS_S that it should not complete the locally created transaction until it is further informed that the MDB_S has returned from on Message. This is necessary because the client regains control (at 506) immediately after sending the message and continues processing. It is therefore possible for it to complete the superior transaction (C_1) before the call to on Message returns. However the locally created transaction, S_1, must not process a transaction completion request until the work done by MDB_S has completed. After this registration Receiver_S calls on Message (511) on MDB_S, passing it the message to process. MDB_S then processes the message, which may, for example, involve access to databases, and transactional resources being registered as participants in the local transaction, S_1. When on Message completes it returns a return code to Receiver_S which indicates whether or not message processing was successful. The receiver then calls (512) the locally created transaction, S-1, to de-register the invocation of the on Message call to MDB_S and pass to the transaction a vote. The vote will be commit if on Message was successful and rollback it was not. The unregister request informs transaction S_1 that it can now process transaction completion requests from transaction C_1. Note that if the vote is rollback the transaction can act on the vote by either marking the transaction rollback only or actually rolling it back. Transaction S_1 then starts a timer which defines how long it is willing to wait for another message to be processed as part of the same transaction or a message comprising a transaction completion request. If the timer expires before such a message is received, transaction S_1 will be rolled back.

Note that preferably MDB_S only does work which can be subsequently backed out. This is because it may be required to rollback the transaction under which the message was sent to MDB_S and in this situation the system should be returned to the state it would be in if the message had never been sent. If MDB_S does non-transactional work, which cannot be backed out, this will not be possible.

Further note that the registration (at 510) of the receiver and subsequent unregistration (at 512) is only necessary if a different receiver or receiver instance (and potentially a different queue) is used for receiving transaction completion requests. If the same receiver instance is used it will not be able to obtain a transaction completion message whilst on Message is in process as it will not regain control until on Message returns.

FIG. 6 shows two phase commit processing for transaction C_1. This is triggered by the client calling commit (601) for the transaction it started. The client then does not regain control until commit processing completes (subsequently shown as step 712 in FIG. 7). On receipt of the commit request JTS_C creates (602) a temporary queue, queueReceiver and messageListener to be used for receiving replies to the prepare and commit requests it plans to send. It then sends (603) a prepare message, which is preferably a non-persistent message, to the remote queue, Q_S, the queue to which the client sent a message (at step 502 in FIG. 5). The prepare message comprises details of the transaction being prepared (i.e.: xid="C_1") and details of a queue to which the vote (reply) should be sent. JMS_C transmits (604) the message to Q_S, preferably on a fast channel, before returning to the JTS_C (605). JTS_C then continues preparing other participants in the transaction, each of which return a vote, before starting a timer which defines the maximum time it is willing to wait for a response to the prepare messages it has just sent (these steps are not shown in the figures).

Meanwhile, the prepare message transmitted at step 604 arrives at the remote JMS, JMS_S, and is delivered (606) to the Receiver_S. However, note that this is not necessarily the same receiver instance as the one to which the original message was delivered (at step 507 of FIG. 5) but could a new instance of the same receiver. Either way, Receiver_S recognises the prepare message and does not pass it to MDB_S but instead calls prepare (607) on the local JTS JTS_S passing the xid of the client transaction C_1. On receipt of this request JTS_S, using the xid of the client transaction, looks up the xid of its locally created subordinate. It then stops the timer started at step 512 of FIG. 5 and calls prepare (not shown) on each of the participants in transaction S_1. Such participants would have registered as part of the processing of the on Message request by MDB_S and may, for example, include one or more databases modified by the MDB S. JTS_S then consolidates the votes from each participant and sends (608) a vote message, preferably a non-persistent message, containing the vote and details of the transaction to which it applies (C_1), back to the reply queue named in the prepare request. This message is transmitted (609) to JTS_C, preferably on a fast channel, which then delivers (610) the message to Receiver_C. Receiver_C then calls (611) vote (via the listener) on JTS_C passing the vote and transaction id (C_1 included in the vote message). Once the JTS has collected all votes it stops the timer started on return from step 505 and computes a final decision, which will be commit unless one or more participants vote rollback, in which case it will be rollback.

Note that if the timer, started by JTS_C after sending the prepare message at step 603, expires before the vote message reply is received, JTS_C stops waiting for the reply and rolls the transaction back by sending rollback requests to each participant.

Assuming that no participants voted rollback and all votes were received in a timely manner, transaction C_1 will be committed and this is shown in FIG. 7. Note that the sequence of flows in FIG. 7 are similar to those of FIG. 6, but the prepare and vote messages of FIG. 6 are substituted for commit and committed messages, respectively, in FIG. 7. JTS_C sends (703) a commit message, preferably a persistent message, containing details of transaction C_1 to the remote queue, Q_S. The message is then transmitted (704), preferably on a fast channel, by JTS_C to the remote queue. Control then returns (705) to JTS_C which continues by committing other participants in the transaction. Once all participants have been instructed to commit JTS_C may optionally wait for a response, such as committed, to commit messages sent out. This is only necessary if JTS_C requires to report heuristic errors (i.e.: in a two phase transaction where a participant has voted commit to prepare and subsequently failed to commit when instructed) and in which case JTS_C starts a timer which defines how long it is willing to wait for a response to commit messages. If the timer expires JTS_C can report an unknown outcome for the transaction. Meanwhile the commit message arrives at the remote system and is delivered (706) to an instance of Receiver_S. Receiver_S recognises the commit message and calls commit (707) on JTS_S, passing details of the transaction, C_1 included with the message. JTS_S obtains the id of the local transaction (S_1) and calls commit on each of its participants (not shown). Once each participant has returned JTS_S sends a message, preferably a non-persistent message, back to JTS_C giving its final outcome which, assuming all participants were successfully committed, is committed (708). This is transmitted (709) to the client system, preferably on a fast channel, where it is delivered (710) to Receiver_S, which passes the outcome on to JTS_C (711). Once JTS_C has obtained an outcome from each participant in the transaction it returns (712) to the client reporting the consolidated outcome.

Note that if, after prepare processing, a decision was reached to rollback the transaction, the flows would be the same as in FIG. 7, except that wherever FIG. 7 shows commit it would instead show rollback. Further a RolledBack message would not be required and so step 708 and subsequent steps would not be required.

Note that in the preferred embodiment, messages, with the exception of a two-phase commit or rollback message, are sent as non-persistent messages on a fast channel. This is because an integrity problem will not be caused if one of the messages is lost because the loss will ultimately result in all transactional work being rolled back. However, once a participant has been successfully prepared it becomes in-doubt and cannot assume commit or rollback. As a result it must be guaranteed to receive an outcome.

In an alternative embodiment the local transaction created at step 508 of FIG. 5, rather than acting as a subordinate transaction to the sender's transaction, could act as a nested transaction inside the sender's transaction, the local transaction being the child and the sender's transaction being the parent. This has a benefit in that a failure in a subordinate transaction will result in the failure of the global transaction but the same is not necessarily true for a nested transaction. In nested transaction semantics a nested transaction can commit locally, but any locally committed changes under the scope of the nested transaction are only be visible to its parent. Locally committed changes are then subsequently committed or aborted according to the outcome of the parent transaction. However, if the nested transaction rolls back, any changes made under the scope of the nested transaction are rolled back and the parent transaction can decide whether or not the failure should cause the parent transaction to roll back and whether or not take remedial action.

Assuming that the transaction created at step 508 of FIG. 5 does act as a nested transaction, preferably the action taken in the event that the nested transaction fails, such as can be reported to the transaction in an unregister request at step 512 of FIG. 5, is to rollback the local transaction (S_1) and re-create the message on the queue in the receiving process. This makes it appear that the message was never processed. As a result the failure would not require the parent transaction to rollback and need not be reported back to the parent transaction. If this option is selected the message received by JMS_C (at step 505 of FIG. 5) must be logged so that it can be later restored to the queue.

Further note, in FIG. 5, after MDB_S returns from the on Message call (step 511) and Receiver_S informs JTS_S of this (step 512), optionally the JTS_S could send a message to JTS_C to inform it that the work item is ready to prepare. In this case JTS_C would need to set up a temporary queue to receive this message and append details of it to the client's message. Further if this option was employed the JTS_S could include with the message details of a queue to which transaction completion messages could be sent. As a result transaction completion messages do not have to be sent to the same queue as the original message.

Further note that in the preferred embodiment, following step 507 of FIG. 5 it is assumed that the Receiver_S is waiting to receive a message outside the scope of a transaction, and as a result it starts a new transaction, at step 508, which is subordinate (or nested in an alternative embodiment) to the transaction started by the sender of the message. However, in other scenarios Receiver_S may be waiting for a message whilst inside the scope of a transaction. In this situation, rather than begin a transaction at step 508 of FIG. 5, it is necessary to convert the existing transaction to either a subordinate or a nested transaction in which case the original transaction coordinator must be able to change its behavior as a result of the setParent call at step 509 of FIG. 5.

Further note that a subset of the flows in FIGS. 5, 6 and 7 illustrate an example of processing a message which is sent to a local queue and is passed to a receiver waiting for the message on a different thread. In this case JMS_C and JMS_S would be merged into a single JMS and the transmit flows (505 of FIG. 5, 606 and 609 of FIG. 6, and 704 and 709 of FIG. 7) would be omitted.

The main steps, according to the preferred embodiment of the present invention, followed by a messaging service, the receiver of the message and the transaction service in the sending process and receiving process are now described in more detail with reference to FIGS. 8 to 17.

Figure 8:
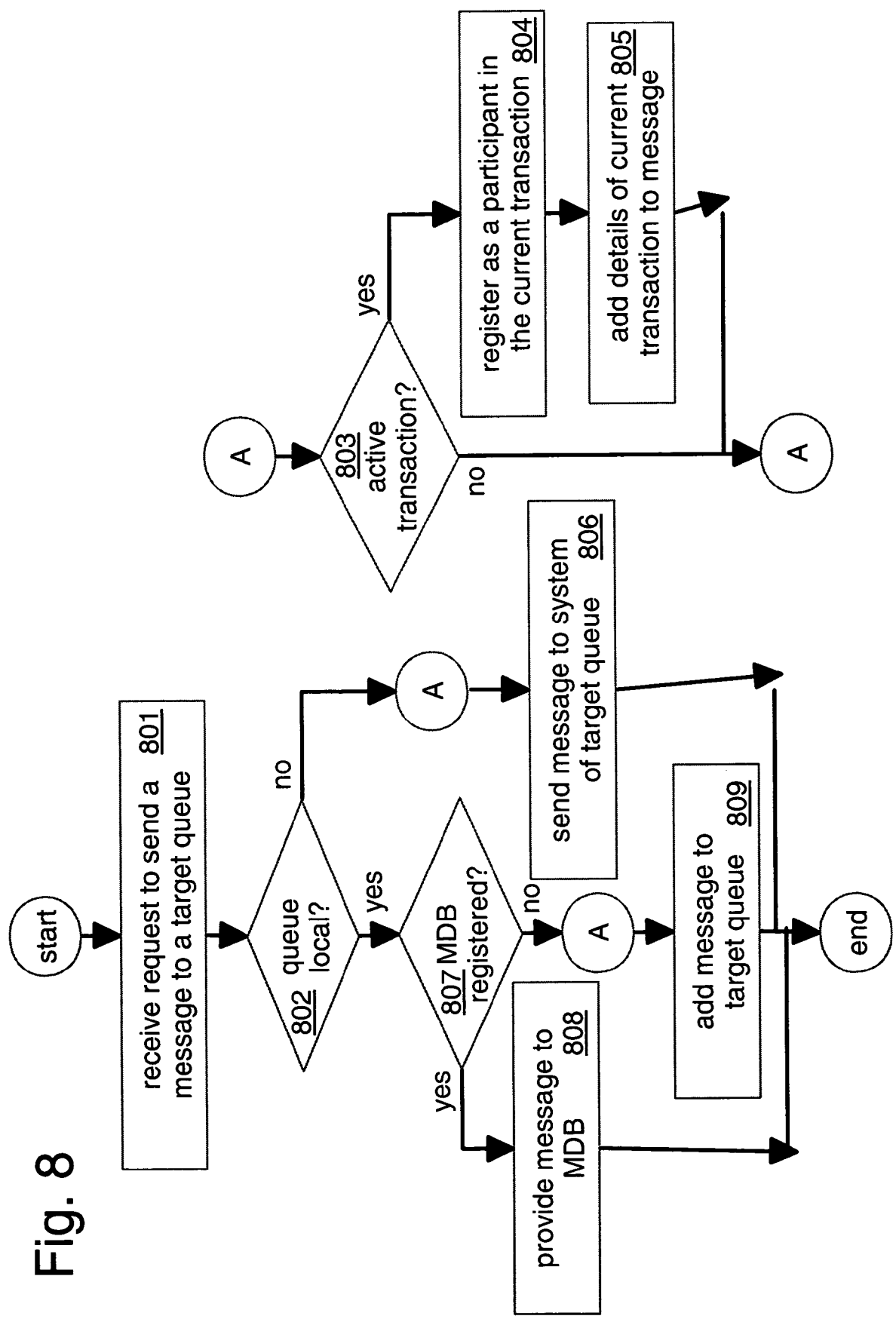
FIG. 8 is a flow chart of the main steps of a messaging service when sending a message under the scope of a transaction.

FIG. 8 is a flow chart of the main steps of the messaging service when it is involved in sending a message. At step 801 it receives a request from a client to send a message to a targeted message queue which may or may not be remote. The request includes the message data. On receipt of the request the messaging service, at step 802, checks to see if the targeted queue of the message is local to the process in which the send request was received. If the queue is not local, processing follows procedure A which, at step 803 checks to see if there is a currently active transaction under the scope of which the send request was made. If there is, the messaging service registers as a participant in it at step 804, the registration involving passing to the transaction service details of the target queue of the message. Procedure A the completes, at step 805, by adding details of the transaction, such as its identifier, to the message to be sent but separate from the data. Then at step 806, whether or not there was an active transaction, the message is sent to the target queue.

However, if the target queue was found to be local at step 802, a further check is made at step 807 to see if an MDB has been registered to receive messages from the queue. If this is the case, at step 808, the message is passed directly to the MDB for processing and not added to the target queue. As a result the processing of the MDB is on the same thread and under the scope of the same transaction as the sending of the message. If step 807 found that there was not an MDB registered to receive messages from the target queue, procedure A is followed for the message before it is added, at step 809, to the queue for later retrieval. For all paths control then returns to the client application. However, note that in another embodiment, for a message sent to a local queue, if there is a receiver registered to receive messages from that queue, the client thread could be blocked whilst the message is passed directly to the receiver and the receiver processes the message. As a result control will not return to the client until the message has been fully processed and the receiver can process under the scope of the transaction under which the message was sent.

As a result of following this method, for message which is processed via a local or remote target queue, the messaging system in which the target system exists will be able to obtain information about the transaction under the scope of which the message was sent. This method may then be followed for each message sent by the sender under the scope of the same transaction.

Figure 9:
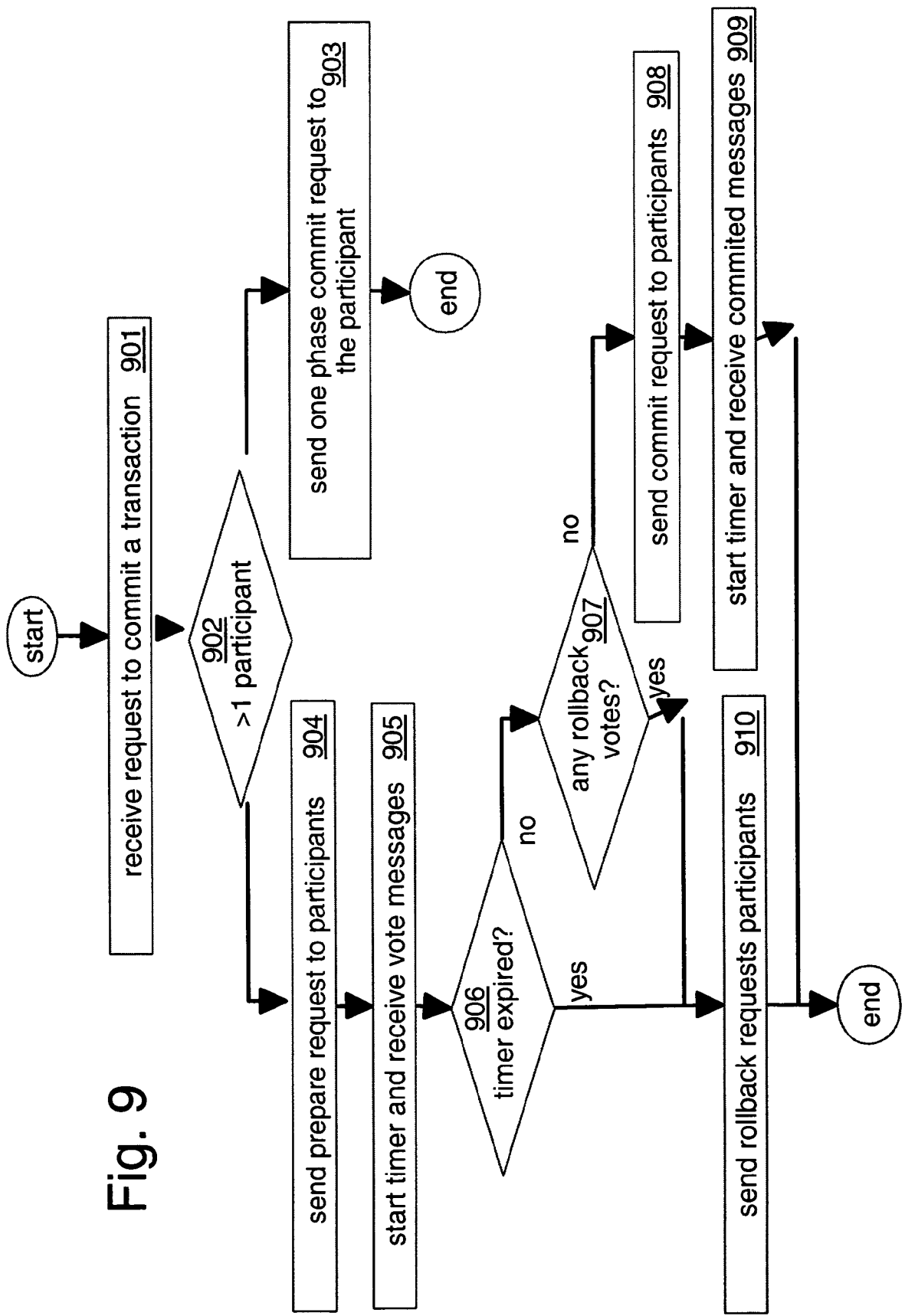
FIG. 9 is a flow chart of the main steps of a transaction service when committing a transaction on behalf of a sender of a message.

FIG. 9 is a flow chart of the transaction service when it is requested to commit the transaction under the scope of which the client application sent a message. At step 901 the commit request is received, and at step 902 a check is made of how many participants are registered with the transaction. If there is only one participant one phase commit processing is followed in which, at step 903, a one phase commit request is issued to the registered participant. This involves either calling a directly registered participant, such as one that would have been registered as a result of MDB processing at step 808 of FIG. 8, or sending a one phase commit message to a queue registered at step 804 of FIG. 8.

If step 902 found that more than one participant had been registered with the transaction two phase commit processing is followed which starts at step 904 where all participants are asked to prepare. For participants involved as a result of step 804 of FIG. 8, this involves sending a prepare message to the target queue which was registered, the message including details of a queue to which a vote should be sent and the transaction being completed. Assuming one or more prepare messages were sent, at step 905, the transaction service starts a timer and waits to receive vote messages in response to the prepare messages. The timer defines how long the transaction service is willing to wait for vote messages, and may, for example, expire if the message sent at step 806 of FIG. 8, was lost in the network due to some sort of failure and was not delivered to the appropriate queue. The transaction service then continues processing once all votes have been received or the timer expires. At step 906 a check is made to see if the timer expired. If it did not, all votes must have been received and as a result, at step 907 a check is made to see if any rollback votes were received. If no rollback votes were received, at step 908 all participants are asked to commit. For participants involved as a result of step 804 of FIG. 8, this involves sending a commit message to the target queue which was registered, the message including details of the transaction being completed. Optionally, assuming one or more commit messages were sent, at step 909 a timer is started and the transaction service waits to receive messages in response to the commit messages. Once all responses have been received, or the timer expires, the transaction is considered to have completed and the transaction service can report an outcome of the transaction (step not shown). If all participant responses indicate that the transaction was committed the outcome will be committed, any other responses will involve some sort of heuristic error.

If the timer was found to have expired at step 906 or a participant was found to have voted rollback at step 907, the transaction is rolled back at step 910 by sending a rollback request to each participant. For participants involved as a result of step 804 of FIG. 8, this involves sending a rollback message to the target queue which was registered, the message including details of the transaction being completed. However, a rollback request does not need to be sent to a participant the voted rollback. Once all participants have been requested to rollback the transaction is considered to have completed.

Note that if the client requested the transaction to be rolled back, the transaction service simply follows steps 901 and 902, with no intermediate steps.

Figure 10:
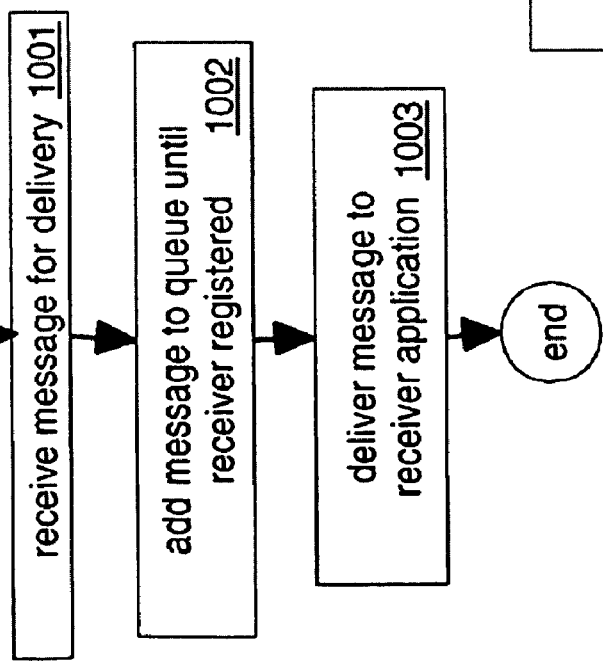
FIG. 10 is a flow chart of the main steps of a messaging service when receiving a message from a sender.

FIG. 10 is a flow chart of the messaging service when receiving a message such as one sent at step 806 of FIG. 8, or steps 904, 908 or 910 of FIG. 9. At step 1001 the message is received by the messaging service in which the target queue is defined. At step 1002 the message is left on the queue and the messaging service waits until a receiver is registered to obtain messages from the queue. Optionally, if the message does have to wait at this step, the message service may inspect the queue for transaction completion messages at periodic intervals and if a rollback message is received the message can be discarded. Note that step 1002 is bypassed if a receiver is already registered when the message is received at step 1001. Once a receiver is registered to receive the message, the message is delivered to it at step 1003. Further note that if the message had been added to a queue at step 809 of FIG. 8, subsequent processing of the message will be as per steps 1002 and 1003 of FIG. 10.

Figure 11:
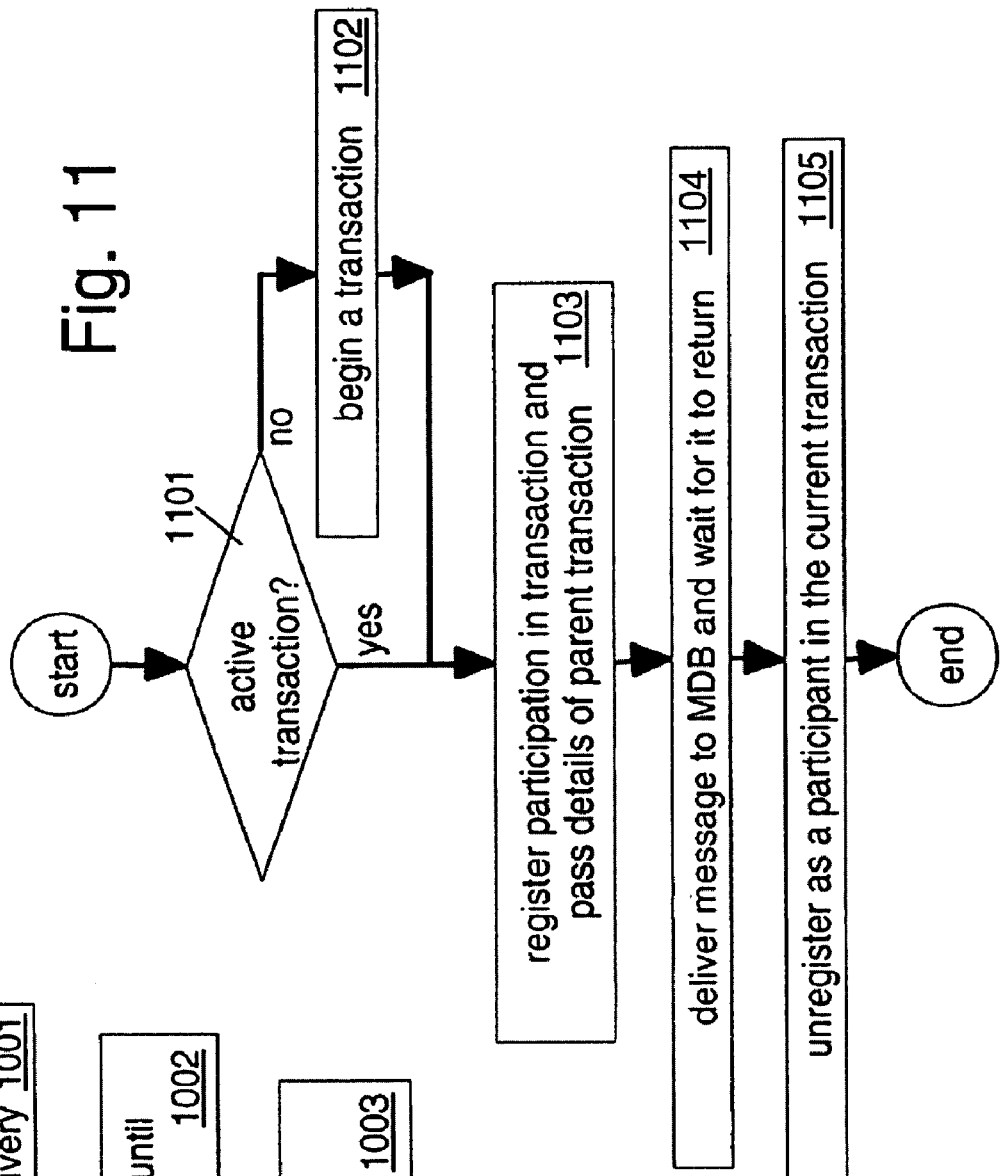
FIG. 11 is a flow chart of the main steps of a message receiver on receiving a message sent to a queue.

FIG. 11 is a flow chart of the receiver when receiving a message such as delivered to it at step 1003 of FIG. 10. At step 1101 a check is made to see if there is an active transaction under which the receiver is running and if there is not, a new transaction is started at step 1102. Whether or not a new transaction was started, at step 1103 the receiver is registered as a temporary participant in the active transaction. As part of this registration the transaction is informed of the transaction under which the message was sent and the details of which were received with the message. In the preferred embodiment this informs the new transaction that it is to act as a subordinate transaction with the sender's transaction as the superior. In an alternative embodiment this may inform the transaction to act as a nested transaction (child) inside the sender's transaction (parent). Further in this alternative embodiment the message service may log the received message so that it can be replaced on the queue should the nested transaction subsequently fail. The message is then delivered to the registered MDB, at step 1104, which processes the message. This may result in participants being registered in the transaction which was active a step 1103. When the MDB has finished processes the message it returns to the receiver passing an indication of whether or not the message was successfully processed. When the MDB returns, the receiver unregisters as a temporary participant in the transaction at step 1105, passing to the transaction service a vote, based on the return code of the MDB, as to the outcome of the transaction. This informs the transaction that it may continue by processing transaction completion requests such as prepare, commit_one_phase, commit or rollback. Further, if the vote was rollback, the transaction service may mark the transaction for rollback only or, if it is a nested transaction, rollback the transaction and restore the message to the target queue for re-processing.

Figure 12:
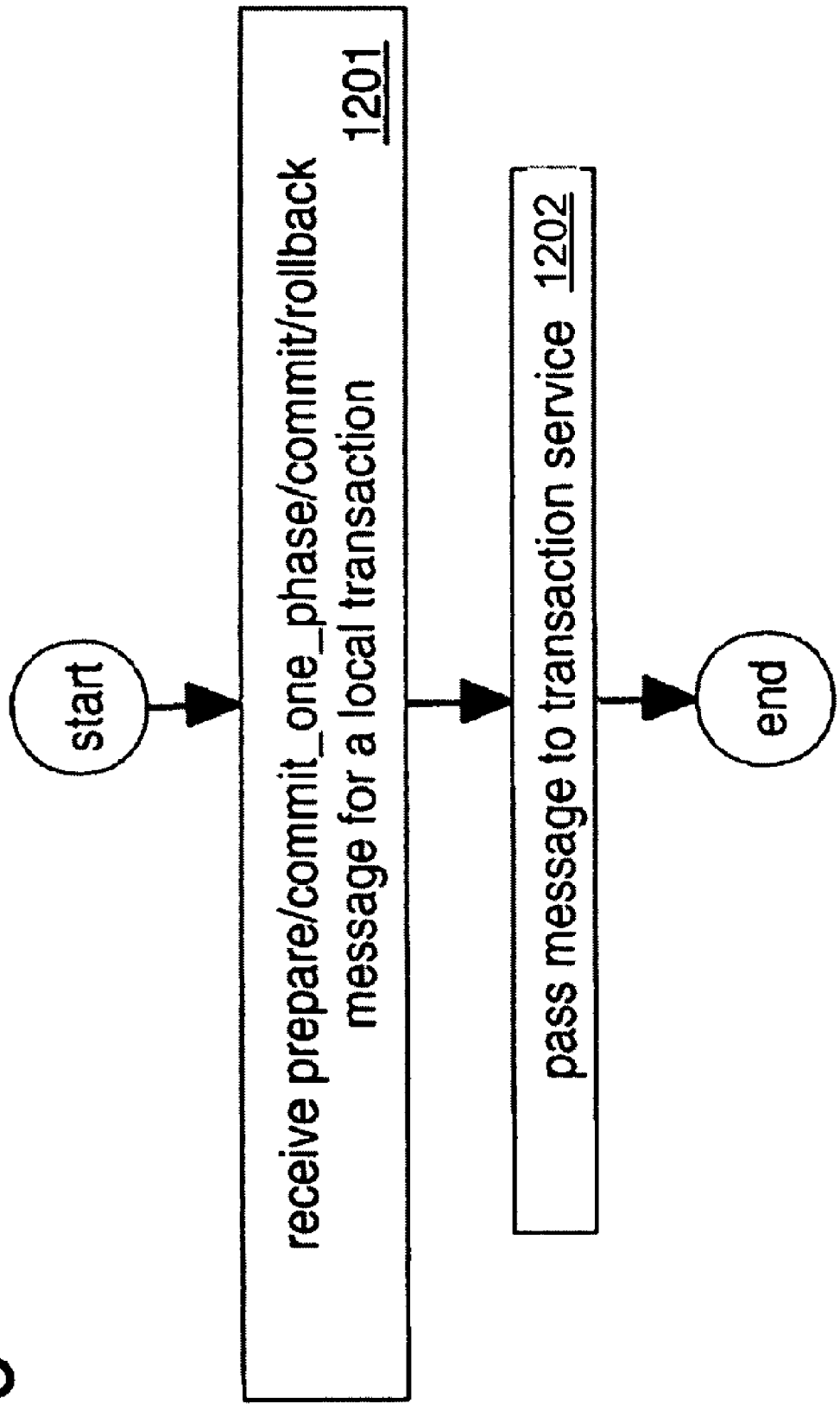
FIG. 12 is a flow chart of the main steps of a message receiver when receiving a prepare/commit/commit_one_phase/rollback message.

FIG. 12 is a flow chart of the receiver on receipt of a transaction completion message. The message is received on the same queue as the original message. At step 1201 the receiver recognises the message as a transaction completion request rather than a message for delivery to an MDB. At step 1202 the receiver delivers details of the message to the transaction service, the details including the xid of the transaction in the sender process that is being completed.

Figure 13:
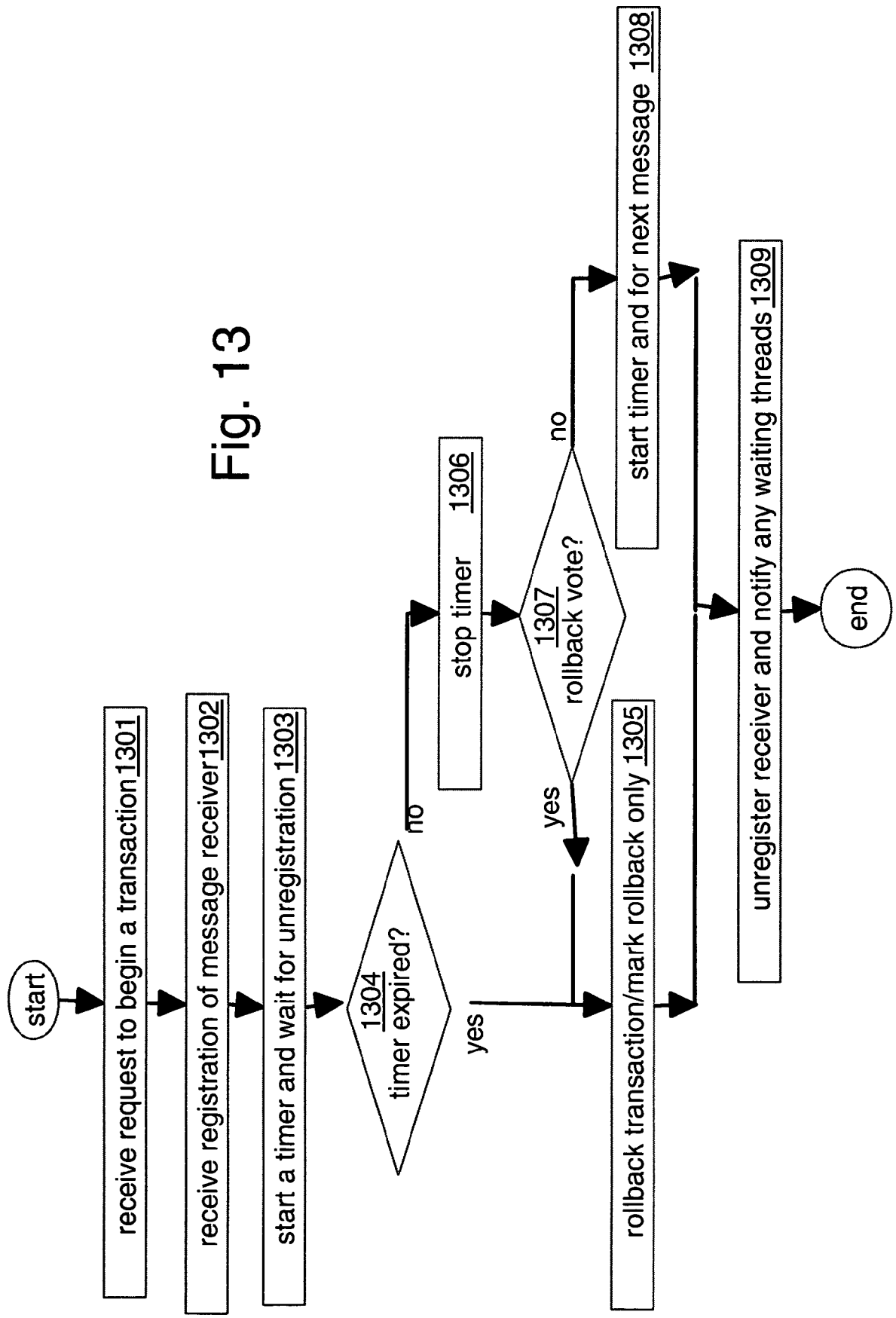
FIG. 13 is a flow chart of the main steps of a transaction service during receipt and processing of a message as in FIG. 11.

FIG. 13 is a flow chart of a method followed by the transaction service during the processing of a message as described in FIG. 11. At step 1301 a request is received to begin a transaction, such as the request 15 made at step 1102 of FIG. 11. However, note that this step is not completed if a transaction is found to be active at step 1101 of FIG. 11. At step 1302 a request to register a receiver as a temporary participant in the transaction, such as the request made at step 1103 of FIG. 11, is received. As part of this registration request the transaction is passed details of its superior/parent transaction. The registration request also informs the transaction not to complete until an unregister request is made for the same temporary participant and as a result at step 1303 the transaction service starts a timer and waits for the unregistration request. The timer defines how long the transaction is willing to wait for the received message to be processed. During this time the transaction service may receive requests from other non-message queue participants, such as databases which are changed as a result of the message processing. When the unregistration is received or the timer expires at step 1304 a check is made to see if it was the timer that expired. If the timer did expire the transaction is either marked rollback only or rolled back and completed at step 1305. As a result any subsequent attempts to register as a participant will be rejected and if the transaction is rolled back any participants already registered with the transaction are rolled back. If the timer was not found to have expired at step 1304, an unregister request must have been received, such as made at step 1105 of FIG. 11. This being the case the timer is stopped at step 1306 and the vote returned with the unregister request is checked at step 1307. If the vote was rollback, processing continues at step 1305 as discussed above. If, however, the vote was commit, at step 1308 a timer is started which defines the maximum amount of time the transaction is willing to wait for another message. If the timer expires the transaction will be rolled back. Finally at step 1309 the temporary participant is marked as unregistered and if there is a thread waiting for this event, as may the case at step 1404 of FIG. 14, the thread is notified.

Figure 14:
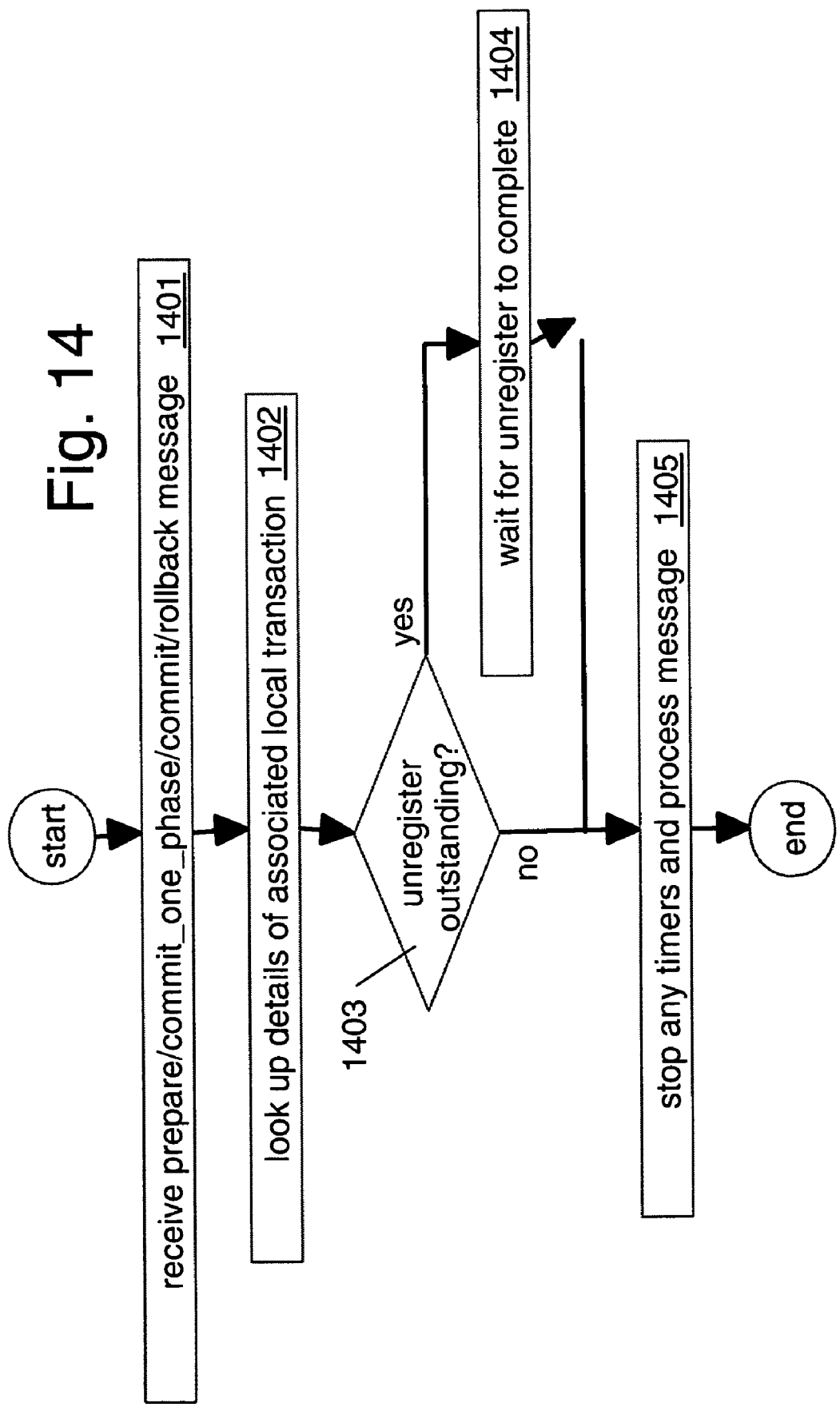
FIG. 14 is a flow chart of the main steps of a transaction service on receipt of a prepare/commit/commit_one_phase/rollback message in the process of the receiver of a message.
Figure 15:
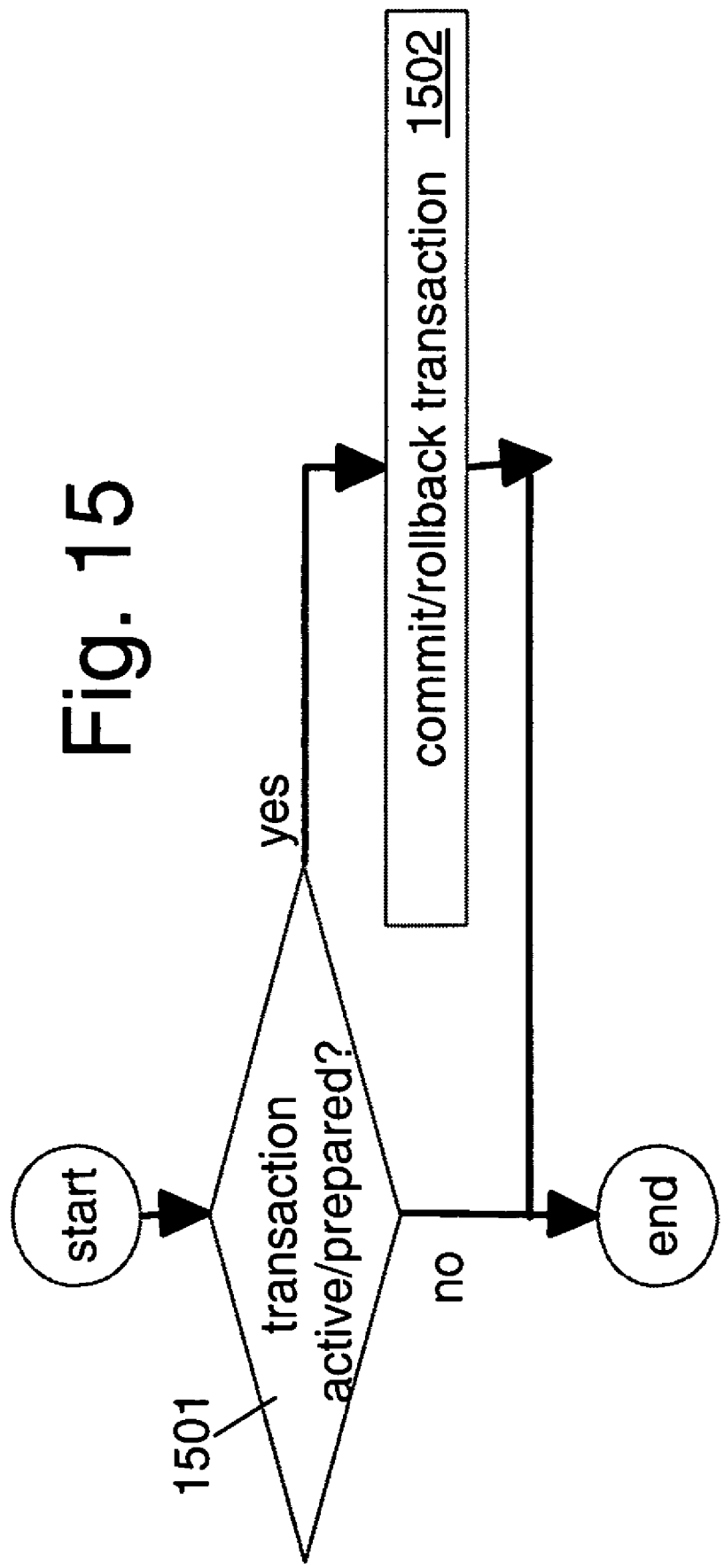
FIG. 15 is a flowchart of the main steps of a transaction service when processing a commit_one_phase or rollback request in the process of the receiver of a message.
Figure 16:
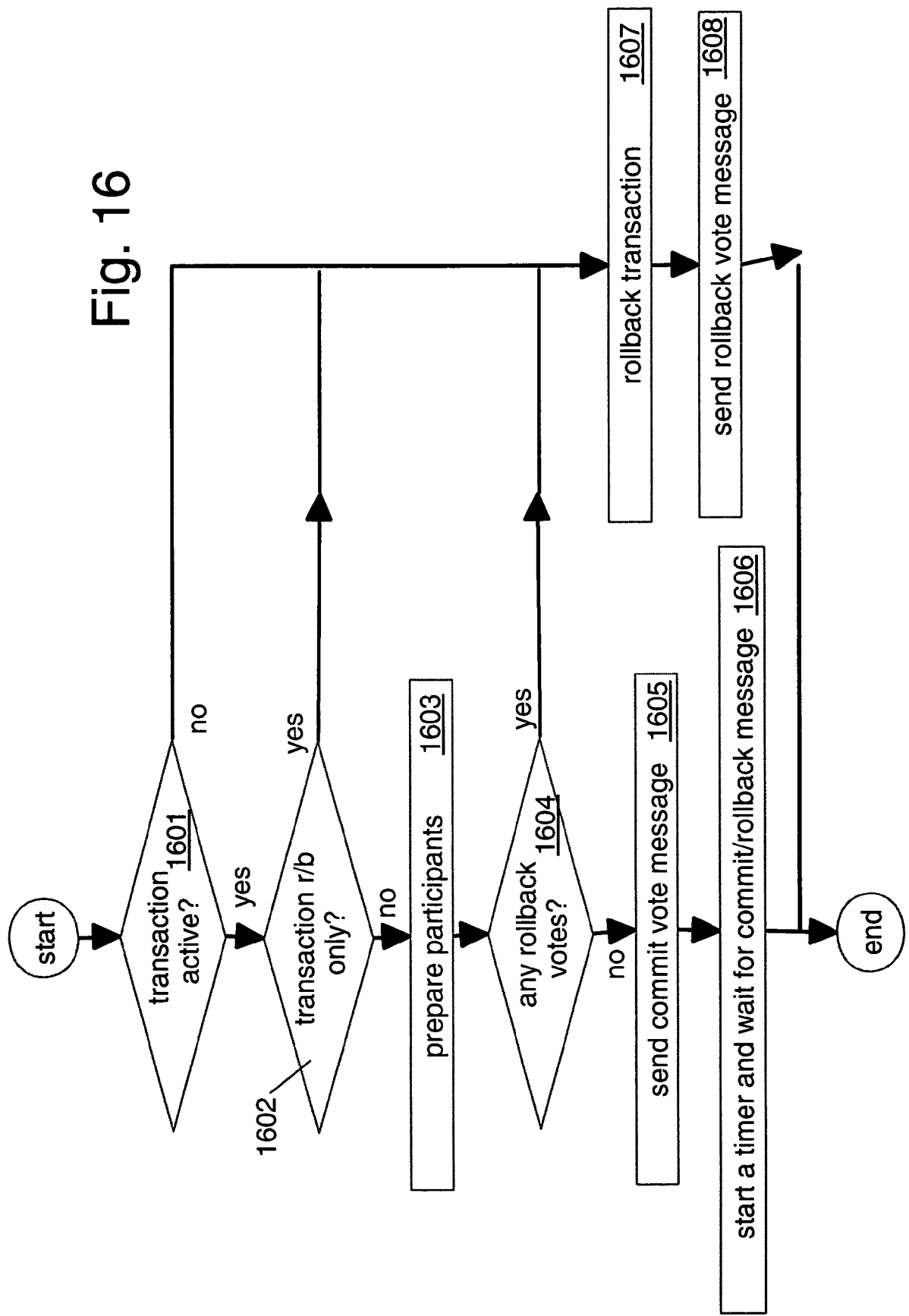
FIG. 16 is a flow chart of the main steps of a transaction service when processing a prepare request in the process of the receiver of a message.
Figure 17:
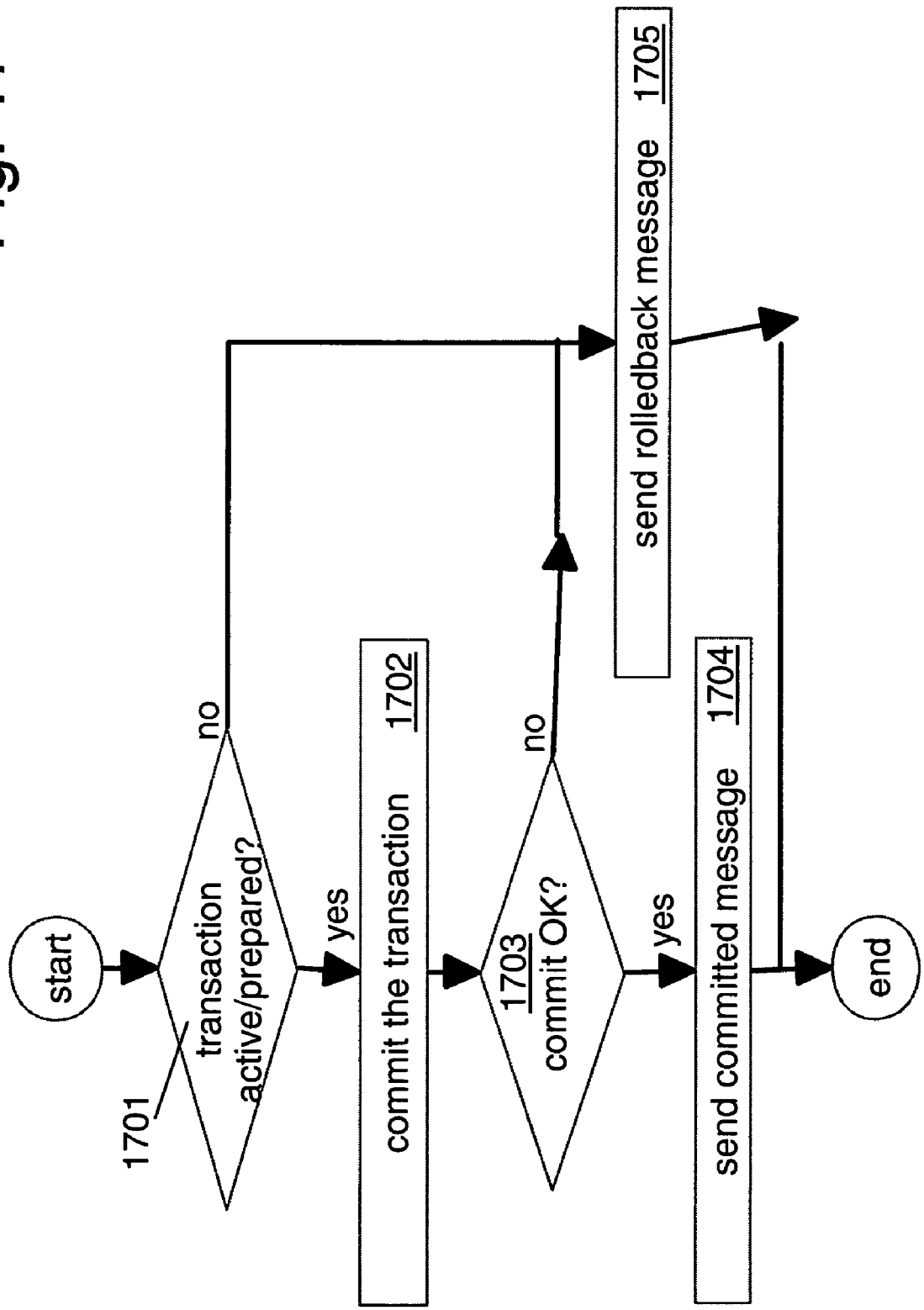
FIG. 17 is a flowchart of the main steps of a transaction service when processing a two phase commit request in the process of the receiver of a message.

FIG. 14 is a flow chart of the method followed by the transaction service during receipt of a message as described in FIG. 12. At step 1401 details of an inbound transaction completion message are received, the message comprising details of the sender's transaction. At step 1402 the transaction service looks up the details of the local transaction associated with the senders transaction. This will be the transaction active at step 1101, or started at step 1102, of FIG. 11. A check is then made, at step 1403, to see if any unregister requests are outstanding which will be the case if the transaction service is waiting, on a different thread, at step 1303 of FIG. 13. If there is an unregister outstanding the processing of the completion message waits, at step 1404 to be notified that the outstanding unregister request has been received. If/when no unregister request are outstanding, the message is processed by the appropriate transaction at step 1405, although before processing starts any appropriate timers are stopped, such as the timers started at step 1308 of FIG. 13, or step 1605 of FIG. 16. FIGS. 15, 16 and 17 describe method followed at step 1403 for various completion messages.

FIG. 15 is a flow chart of the method followed by the transaction service when processing a commit_one-phase or rollback request. At step 1501 a check is made to see if the transaction to be completed exists and is in a appropriate state to be completed. This may not be the case for example if the transaction was rolled back at step 1305 of FIG. 13. Assuming the transaction is in the correct state all registered participants are informed of the outcome and the transaction completes at step 1502.

FIG. 16 is a flow chart of the method followed by the transaction service when processing a prepare request. At step 1601 a check is made to see if the transaction is currently active. If it is, at step 1602 a check is made to see if the transaction has been previously marked rollback only, such as at step 1305 of FIG. 13. If it has not been marked rollback only, at step 1603 all registered participants are asked to prepare and each replies with a vote. Once all votes have been received, at step 1604 a check is made to see if any participants voted rollback. If no participants did vote rollback, at step 1605, a commit vote message is send to the senders transaction service. This is sent to a queue, the details of which were received with the prepare message. Receipt of such a vote message is shown at step 905 of FIG. 9. After the message is sent the transaction service, at step 1605, starts a timer and waits for a subsequent commit or rollback message. This timer should be a relatively long one because if it expires the transaction service will need to independently decide an outcome for the transaction which may result in a heuristic outcome. Note that the steps associated with expiry of the timer are not shown. If the transaction was found to be in an incorrect state (step 1601) or to have been marked rollback only (step 1602), or step 1604 found that a participant had voted rollback, at step 1607 the transaction is rolled back if this had not been done already. Then at step 1608 a rollback vote is sent in a message back to the senders transaction. Note that after voting rollback the transaction does not expect to receive any more messages relating to the transaction.

FIG. 17 is a flow chart of the method followed by the transaction service when processing a two phase commit request such as that step 1606 of FIG. 16 anticipates receiving. At step 1701 a check is made to see if the transaction is in active or prepared state. Preferably the transaction has previously been prepared and is in prepared state, but if it is in active state the best the course of action is to try to commit the transaction and ignore the sequence error. If the transaction is in one of these states the transaction is committed, at step 1702, by instructing all participants to commit. At step 1703 a check is made to see if all participants did actually commit and if this is the case a committed message is sent at step 1704 to the senders transaction. However, if the transaction was found to be in a bad state (e.g.: rolled back) at step 1701, or one of the participants were found to have failed during commit at the step 1704, step 1705 sends a rolled back message to the senders transaction, although in an alternative embodiment the message may include details of the type of heuristic failure.

Note that in FIGS. 8 to 17, the steps of the transaction service required to cope with process failures are not included. These steps would be reasonably obvious to one skilled in the art and are required in a working system. For completeness the missing steps are described here. Immediately prior to sending a prepare message to a target queue, at step 904 of FIG. 9, the transaction must securely log the existence of the target queue. This is because if the process of the sending process fails it must remember to notify the target queue of the outcome of the transaction when the process is restarted. Also, when the transaction completes after step 909, the transaction service must securely log the outcome of the transaction is a transaction completion message is outstanding. Further, the receiving process must, prior to completing prepare processing, securely log the existence of the queue to which the vote is sent. This is because if the receiving process fails after the local transaction has returned its vote, on restart is will need to request the outcome of the transaction from the sending process. Note that if either process fails before securely logging these details, on restart each can safely rollback and outstanding transactional work.

Thus the preferred embodiment enables transactional work, done as a result of a recipient processing an asynchronous message, to be involved in the transaction under which message was sent. Involvement may be directly in the senders transaction or indirectly through a separate (local) transaction which can be a subordinate to, a child of, or merged with the transaction under which message was sent. If the message it added to a queue for subsequent delivery to a recipient, details of the transaction under which message was sent are added to the message. As a result the recipient can take appropriate action to ensure that any transactional work, it causes to happen, will be done directly or indirectly under the scope of the transactions under which message was sent.

Note that the local transaction may already exist or may need to be started when the message is received for processing. If the local transaction is a child transaction, in the event that it fails, the message can be restored to the appropriate queue in the receiving process such that it can be processed by a subsequent receiver or receiver instance. However, this is just one method of implementation that would achieve this result and in practice there are many alternatives. For instance, it is a goal of the preferred embodiment to make the invention transparent to sender and receiver of the message and to use messages as the sole communication means between processes, although a person skilled in the art will understand that many alternatives are possible for example remote procedure calls (RPC). Note that the receiving process and sending process can be the same process.

Further, by adopting this concept it is possible to include a plurality of units of work, each carried out as a result of a message delivered asynchronously, in the same transaction.

Note that the preferred embodiment is described in terms of a messaging service and transaction service based on the J2EE specification. However the invention is not restricted to this environment. For example the messaging service could be an implementation of IBM's MQ Series product. In this environment the receiver would be a listener that does, for example, get with wait from the message queue and then either processes the message obtained or passes it to another application for processing.

In an alternative embodiment, for example, in which the MDB's of the preferred embodiments are considered applications, when a message is being sent to a queue for processing by an application the message is passed directly to the application and is not added to a queue. For example see FIG. 4 but with MDB_C replaced by an application. This is achieved using a new style queue definition. In the prior art, as previously described with reference to FIG. 3, a queue is defined to which a message is sent for subsequent retrieval by an MDB, the MDB being the application defined to process the message. In the new style queue definition an operation of the application is defined for processing messages sent to the queue. For example:

define QAPP(appQueue) dll(mydll) entry(mycode);

This defines an application queue named "appQueue" which provides an operation of "mycode" which is provided in the dll "mydll", the "mycode" operation being defined for processing messages sent to the queue. For a queue defined in this manner when a message is sent to the application queue "appQueue", the message is passed directly to the "mycode" operation and is not queued in a queue. To enable this the "mycode" operation is written to receive a message in a way defined by the messaging system, for example the operation could be defined as:

mycode(MQHCONN hconn, MQMD header, MQBYTE message[ ], MQLONG *cc, MQLONG *rc);

in which: "hconn" is the connection environment; "header" is the message header, "message[ ]" is the message content, "cc" and "rc" are return values set by "mycode" as a result of processing the message.

The effect of this new queue definition is that when a message is sent (put) to "appQueue" by a sender, the message is given directly to the "mycode" operation rather than being added to a queue named "appQueue". As a result the message is processed immediately and, if the application is local to the sender, any work done by "mycode" is carried out as part of the transaction under which the message was sent. When "mycode" completes the return values are returned to the sender and appear to the sender to be from the send request. Thus the sender need not be aware that the message was given directly to the receiving application rather than being added to a queue.

As a result in this embodiment, for example, when a message is sent to an application queue, with reference to FIG. 4, the MDB MDB_C is replaced with an application queue, for example "appQueue", and the on Message flow (403) in which the message is delivered to the MDB_C is replaced by a call to the operation, for example "mycode", defined for processing messages for the application queue. Alternatively, for example, an application queue may be defined for an MDB and define the on Message operation as the operation for processing the message.

Further, this embodiment may be employed in a remote system to which a remote message is delivered. In this case a message received from a remote system which is targeted to an application queue is passed directly to the operation defined for processing the message. However in this case either the messaging system or the application queue must be transactionally aware. For example, with reference to FIG. 5 Receiver_S is replaced by the application queue and the deliver flow (507) is replaced by a call to the operation defined for processing messages sent to the queue. In this case either JMS_S or the application queue must complete the begin (508), setParent (509), register (510) and unregister (512) flows. Further the on Message call (511) is not required, although the application queue on receipt of a message could, for example, pass the message to an MDB using an on Message call. If JMS_S does this it must make the begin (508), setparent (509) and register (510) flows prior to calling the operation to process the message, and the unregister (512) call on return from the operation. Further, with reference to FIGS. 6 and 7, the prepare and commit flows (607 and 707) must be made either by JMS_S or the application queue. If JMS_S does this the deliver flows (606 and 706) are not required and alternatively, if the application queue does this the deliver flows (606 and 706) are replaced by calls to the operation defined for processing messages sent to the application queue.

Further, in this embodiment the application queue on receipt of a message could pass the message to an MDB using in on Message Note, in this embodiment, the sender of the message need not be aware of the use of an application queue by the receiver of the message and can continue to PUT messages as if they were to be processed asynchronously. Where the receiver is an MDB, the receiving code is also not aware of the change in environment and the only change required is to the configuration of the 'queue' linking the sender to the MDB. In more conventional procedural environments, this alternative embodiment requires not only queue reconfiguration, but also a change to the receiving code. Further note that without the embodiment the receiving code issues a message get (with wait) call, but with the embodiment the receiving code is presented with the a message on arrival and may need to be aware of this different pattern.

Note, it would be obvious to a person skilled in the art that the present invention is not limited to message queuing systems, but the method could be applied to any system which enables asynchronous requests to be issued under the scope of a transaction.

The invention claimed is:

1. A data processing method for a data processing system comprising a messaging service and a transaction service, the method comprising:

receiving a request to send an asynchronous message to a queue, wherein the request is received by the messaging service under the scope of a transaction, wherein the request is received from a sender and the asynchronous message comprises message data;

registering a definition for the queue with the messaging service, the definition providing details of an operation provided by a recipient;

processing the request to send the asynchronous message by delivering the asynchronous message to the recipient, wherein the request is processed by the messaging service prior to completion of the transaction, and the asynchronous message is delivered to the recipient by calling the operation and including details of the asynchronous message and wherein the recipient is registered with the messaging service to process messages from the queue;

receiving one or more requests, at the transaction service, to register involvement of one or more participants in the transaction, wherein each of the one or more participants represents transactional work done as a result of the recipient processing the asynchronous message; and completing the transaction by the transaction service wherein the completing the transaction comprises instructing each of the one or more participants to complete, wherein transactional work done, as a result of the recipient processing the asynchronous message, is involved in the transaction under the scope of which the asynchronous message was sent to the recipient from the messaging service.

2. The method as claimed in claim 1 wherein one of the one or more requests to register involvement of one or more participants in the transaction, registers involvement of the recipient as a participant in the transaction.

3. The method as claimed in claim 2 wherein the one of the one or more requests to register the involvement of the recipient as a participant in the transaction includes details of the queue, wherein the completing the transaction comprises instructing the recipient to complete by sending one or more messages to the queue.

4. The method as claimed in claim 2 wherein the request to register the involvement of the recipient as a participant in the transaction includes details of a second queue to the transaction wherein the completing the transaction comprises instructing the recipient to complete by sending one or more messages to the second queue.

5. The method as claimed in claim 1 wherein the transaction is a first transaction and the method further comprises:

processing the asynchronous message by the recipient wherein the processing of the asynchronous message by the recipient comprises:

informing a second transaction of the first transaction, details of which were included with the asynchronous message; and calling a second recipient and, as part of calling the second recipient, passing the asynchronous message data to the second recipient for processing under the scope of the second transaction.

6. The method as claimed in claim 5 wherein the processing of the asynchronous message by the recipient comprises starting the second transaction.

7. The method as claimed in claim 5 wherein the processing of the asynchronous message by the recipient comprises prior to calling the second recipient, registering as a temporary participant in the second transaction; and on return from calling the second recipient, unregistering as a temporary participant in the second transaction.

8. The method as claimed in claim 7 wherein as part of the unregistering as a temporary participant a vote is passed to the second transaction, the vote comprising an indication as to whether the second transaction should commit or rollback.

9. The method as claimed in claim 8 further comprising:

in response to the unregistering as a temporary participant, including a vote comprising an indication that the second transaction should rollback, marking the second transaction as rollback only.

10. The method as claimed in claim 5 wherein the second transaction acts as a subordinate transaction to the first transaction, details of which were included with the asynchronous message.

11. The method according to claim 5 wherein the second transaction acts as a nested transaction within the first transaction, details of which were included with the asynchronous message.

12. The method as claimed in claim 8 wherein the second transaction acts as a nested transaction within the first transaction, details of which were included with the asynchronous message and the method further comprises:

in response to the unregistering as a temporary participant, including a vote comprising an indication that the second transaction should rollback, rolling back the second transaction; and restoring the asynchronous message to the queue.

13. A data processing system comprising a messaging service and a transaction service, the system comprising:

means for the messaging service to receive a request to send an asynchronous message to a queue, wherein the request is received under the scope of a transaction, wherein the request is received from a sender and the asynchronous message comprises message data;

means for registering a definition for the queue with the messaging service, the definition providing details of an operation provided by a recipient;

means for the messaging service to process the request to send the asynchronous message by delivering the asynchronous message to the recipient, prior to completion of the transaction, and the asynchronous message is delivered to the recipient by calling the operation and including details of the asynchronous message and wherein the recipient is registered with the messaging service to process messages from the queue;

means for the transaction service to receive a request to register involvement of a participant in the transaction, wherein the participant represents transactional work done as a result of the recipient processing the asynchronous message; and means for the transaction service to complete the transaction comprising instructing the participant in the transaction to complete, wherein transactional work done, as a result of the recipient processing the asynchronous message, is involved in the transaction under the scope of which the asynchronous message was sent to the recipient from the messaging service.

14. The data processing system as claimed in claim 13 wherein the means for receiving a request to register involvement of a participant in the transaction receives a request to register involvement of the recipient as a participant in the transaction.

15. The data processing system as claimed in claim 14 wherein the request received to register the involvement of the recipient in the transaction includes details of the queue, wherein the means for the transaction service to complete the transaction instructs the recipient to complete by sending one or more messages to the queue.

16. The data processing system as claimed in claim 14 wherein the request received to register the involvement of the recipient in the transaction includes details of a second queue, wherein the means for the transaction service to complete the transaction instructs the recipient to complete by sending one or more messages to the second queue.

17. The data processing system as claimed in claim 13 wherein the transaction is a first transaction and the recipient comprises:

means for processing the asynchronous message, wherein the means for processing the asynchronous message by the recipient comprise:

means for informing a second transaction of the first transaction, details of which were included with the asynchronous message; and means for calling a second recipient and as part of the calling the second recipient, passing the asynchronous message data to the second recipient for processing under the scope of the second transaction.

18. The data processing system as claimed in claim 17 wherein the means for processing the asynchronous message by the recipient further comprises:

means for starting the second transaction.

19. The data processing system as claimed in claim 17 wherein the means for processing the asynchronous message by the recipient further comprises:

means for registering as a temporary participant in the second transaction, prior to calling the second recipient; and means for unregistering as a temporary participant in the second transaction, on return from calling the second recipient.

20. The data processing system as claimed in claim 19 wherein the means for unregistering passes a vote to the second transaction, the vote comprising an indication as to whether the second transaction should commit or rollback.

21. The data processing system as claimed in claim 20 further comprising:

means, responsive to the means for unregistering as a temporary participant, passing a vote comprising an indication that the second transaction should rollback, for marking the second transaction as rollback only.

22. The data processing system as claimed in claim 17 wherein the second transaction acts as a subordinate transaction to the first transaction, details of which were included with the asynchronous message.

23. The data processing system as claimed in claim 17 wherein the second transaction acts as a nested transaction within the first transaction, details of which were included with the asynchronous message.

24. The data processing system as claimed in claim 20 wherein the second transaction acts as a nested transaction within the first transaction, details of which were included with the asynchronous message and the data processing system further comprises:

means, responsive to the means for unregistering as a temporary participant, including a vote comprising an indication that the second transaction should rollback, for rolling back the second transaction; and means for restoring the asynchronous message to the queue.

25. A computer program product comprising instructions encoded in a computer readable medium, which, when executed on a data processing host, cause the host to perform operations that comprise:

receiving a request to send an asynchronous message to a queue, wherein the request is received by the messaging service under the scope of a transaction, wherein the request is received from a sender and the asynchronous message comprises message data;

registering a definition for the queue with the messaging service, the definition providing details of an operation provided by a recipient;

processing the request to send the asynchronous message by delivering the asynchronous message to the recipient, wherein the request is processed by the messaging service prior to completion of the transaction, and the asynchronous message is delivered to the recipient by calling the operation and including details of the asynchronous message and wherein the recipient is registered with the messaging service to process messages from the queue;

receiving one or more requests, at the transaction service, to register involvement of one or more participants in the transaction, wherein each of the one or more participants represents transactional work done as a result of the recipient processing the asynchronous message; and completing the transaction by the transaction service wherein the completing the transaction comprises instructing each of the one or more participants to complete, wherein transactional work done, as a result of the recipient processing the asynchronous message, is involved in the transaction under the scope of which the asynchronous message was sent to the recipient from the messaging service.

26. The computer program product as claimed in claim 25 wherein one of the one or more requests to register involvement of one or more participants in the transaction, registers involvement of the recipient as a participant in the transaction.

27. The computer program product as claimed in claim 26 wherein the request to register the involvement of the recipient as a participant in the transaction includes details of the queue, wherein the completing the transaction comprises instructing the recipient to complete by sending one or more messages to the queue.

28. The computer program product as claimed in claim 26 wherein the request to register the involvement of the recipient as a participant in the transaction includes details of a second queue to the transaction wherein the completing the transaction comprises instructing the recipient to complete by sending one or more messages to the second queue.

29. The computer program product as claimed in claim 25 wherein the transaction is a first transaction and the operations further comprise:

processing the asynchronous message by the recipient;

wherein the processing of the asynchronous message by the recipient comprises informing a second transaction of the first transaction, details of which were included with the asynchronous message; and calling a second recipient and as part of the calling a second recipient passing the asynchronous message data to the second recipient for processing under the scope of the second transaction.

30. The computer program product as claimed in claim 29 wherein the processing of the asynchronous message by the recipient comprises the further operation of:

starting the second transaction.

31. The computer program product as claimed in claim 29 wherein the processing of the asynchronous message by the recipient comprises the further operations of:

prior to calling the second recipient, registering as a temporary participant in the second transaction; and on return from calling the second recipient, unregistering as a temporary participant in the second transaction.

32. The computer program product as claimed in claim 31 wherein as part of the operation of unregistering as a temporary participant in the second transaction a vote is passed to the second transaction, the vote comprising an indication as to whether the second transaction should commit or rollback.

33. The computer program product as claimed in claim 32, wherein the operations further comprise:

in response to the operation of unregistering as a temporary participant in the second transaction including a vote comprising an indication that the second transaction should rollback, marking the second transaction as rollback only.

34. The computer program product as claimed in claim 29 wherein the second transaction acts as a subordinate transaction to the first transaction, details of which were included with the asynchronous message.

35. The computer program product according to claim 29 wherein the second transaction acts as a nested transaction within the first transaction, details of which were included with the asynchronous message.

36. The computer program product as claimed in claim 32 wherein the second transaction acts as a nested transaction within the first transaction, details of which were included with the asynchronous message and the operations further comprise:

in response to the unregistering as a temporary participant in the second transaction including a vote comprising an indication that the second transaction should rollback, rolling back the second transaction; and restoring the asynchronous message to the queue.

* * * * *